(12) United States Patent
Sakayanagi

(10) Patent No.: US 8,538,660 B2
(45) Date of Patent: Sep. 17, 2013

(54) VEHICLE CONTROL APPARATUS AND CONTROL METHOD

(75) Inventor: Yoshihiro Sakayanagi, Gotenba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 966 days.

(21) Appl. No.: 12/597,801

(22) PCT Filed: Apr. 25, 2008

(86) PCT No.: PCT/IB2008/001026
§ 371 (c)(1),
(2), (4) Date: Oct. 27, 2009

(87) PCT Pub. No.: WO2008/132588
PCT Pub. Date: Nov. 6, 2008

(65) Prior Publication Data
US 2010/0088005 A1 Apr. 8, 2010

(30) Foreign Application Priority Data

Apr. 27, 2007 (JP) .................................. 2007-119820
Jan. 25, 2008 (JP) .................................. 2008-015250

(51) Int. Cl.
*B60G 17/018* (2006.01)
*G06F 19/00* (2011.01)
*G06F 17/00* (2006.01)
*G06G 7/70* (2006.01)
*G05B 13/02* (2006.01)

(52) U.S. Cl.
USPC ........... 701/102; 701/103; 701/106; 701/110; 701/115; 700/29; 700/44; 700/52

(58) Field of Classification Search
USPC .................... 123/395, 405, 403; 701/40, 101, 701/102, 103, 104, 106, 110, 115; 702/182, 702/190, 191, 193, 194, 196, 197; 700/28, 700/31, 40, 42, 43, 44, 47, 50, 52
See application file for complete search history.

(56) References Cited

U.S. PATENT DOCUMENTS 5,925,089 A * 7/1999 Fujime .......................... 701/106
(Continued)

FOREIGN PATENT DOCUMENTS

| JP | 2005-069021 A | 3/2005 |
| JP | 2005-069141 A | 3/2005 |
| JP | 2006-200466 A | 8/2006 |

OTHER PUBLICATIONS

J.W. Grizzle et al.: "Improved Cylinder Air Charge Estimation for Transient Air Fuel Ratio Control", Jun. 29, 1994-Jul. 1, 1994, vol. 2, Jun. 29, 1994, pp. 1568-1573, XP010304482.
Hideo Nakamura et al.: "An Axle Torque Control Scheme to Achieve Various Desired Characteristics", Nissan Motor Co., Ltd., No. 901763, pp. 57-67.

(Continued)

*Primary Examiner* — Stephen K Cronin
*Assistant Examiner* — Raza Najmuddin
(74) *Attorney, Agent, or Firm* — Sughrue Mion, PLLC

(57) ABSTRACT

With the use of a model expression (FIG. 9C), of which inputs include a desired value of an in-cylinder air amount that is a controlled object of a system and predetermined parameters, such as engine speed (ne), a desired throttle opening degree ($\theta_{ref}$) required to control the in-cylinder air amount to the desired value is calculated. In this model expression, parameters, such as the engine speed (ne), that oscillate at a relatively high frequency are excluded from subjects of differentiation, and the desired in-cylinder air amount value only is included in the subjects of differentiation.

19 Claims, 20 Drawing Sheets

(56) References Cited

U.S. PATENT DOCUMENTS

| | | | |
|---|---|---|---|
| 6,047,681 A | 4/2000 | Scherer et al. | |
| 6,256,575 B1 | 7/2001 | Sans | |
| 6,460,409 B1 * | 10/2002 | Soliman et al. | 73/114.72 |
| 6,640,622 B2 * | 11/2003 | Soliman et al. | 73/114.32 |
| 6,718,822 B2 * | 4/2004 | Soliman et al. | 73/114.32 |
| 7,457,701 B2 * | 11/2008 | Tanaka | 701/103 |
| 7,975,670 B2 * | 7/2011 | Ito | 123/339.11 |
| 2004/0074473 A1 * | 4/2004 | Okubo et al. | 123/339.23 |
| 2005/0056250 A1 | 3/2005 | Stroh | |
| 2007/0068489 A1 | 3/2007 | Osumi et al. | |
| 2008/0237517 A1 * | 10/2008 | Krupadanam | 251/129.01 |

OTHER PUBLICATIONS

A. R. Aslani et al.: "Dynamic Modeling of a Port Fuel-Injected Engine with Sensitivity Analysis", SAE International Paper Series 2004-07-1771, 2004 SAE World Congress, Detroit, Michigan, Mar. 8-11, 2004.

James R. Cloutier et al.: "State-Dependent Riccati Equation Techniques: An Overview", Navigation and Control Branch, U.S. Air Force Armament Directorate. Eglin AFB, FL 32542-6810, Proceedings of the American Control Conference, Albuquerque, New Mexico, Jun. 1997, pp. 932-936.

Shinya Satou et al.: "Improvement for Torque Control Precision in Torque-Based Engine Control", May 24, 2006, pp. 21-26.

* cited by examiner

VEHICLE CONTROL APPARATUS AND CONTROL METHOD

FIELD OF THE INVENTION

The invention relates to a vehicle control apparatus and a control method. In particular, the invention relates to an apparatus for controlling a vehicle and a method of controlling an actuator installed in a vehicle, in which a desired value of a controlled variable of the actuator installed in the vehicle is calculated using model expressions.

BACKGROUND OF THE INVENTION

In Japanese Patent Application Publication No. 2006-200466 (JP-A-2006-200466), an output control apparatus for an internal combustion engine is described. In this apparatus, the desired throttle valve opening degree is calculated using an inverse model of the intake system model and an inverse model of the throttle model in order to achieve a desired torque of the internal combustion engine with good response. In the above-described apparatus, the engine speed and the valve timing, which are parameters to be inputted into the inverse model, are processed with a filter to stabilize the control of output from the internal combustion engine.

When a differentiation is included in the process of deriving the model expressions as in the case of the related art described in JP-A-2006-200466, the system becomes overly responsive to the engine speed and the pressure in the intake pipe that continuously vary by a small amount. More specifically, when the parameters in the model expressions include a parameter having high-frequency oscillatory components, such as the engine speed, unexpected noise is amplified when the parameter is differentiated.

It is conceivable to use a filtering process as in the case of the related art described in JP-A-2006-200466 in order to solve the above problem. However, although such a filtering process contributes to improvement in stability of the control, there is room for improvement in the response of the system.

DISCLOSURE OF THE INVENTION

The invention provides an apparatus for controlling a vehicle and a method of controlling an actuator installed in a vehicle, which favorably reduce superposition of large noise on the desired value of a controlled variable of the actuator installed in the vehicle without impairing the response of a system.

A first aspect of the invention relates to a vehicle control apparatus. The vehicle control apparatus calculates a desired value of a controlled variable of an actuator installed in a vehicle, using a model expression including a derivative portion in which at least one of predetermined parameters that are inputted is differentiated with respect to time. The predetermined parameters are divided into a first parameter group, to which part of the predetermined parameters belong that oscillate at frequencies higher than a first frequency, and a second parameter group, to which remaining part of the predetermined parameters belong that oscillate at frequencies lower than a second frequency that is lower than the first frequency. Only the remaining part of the predetermined parameters that belong to the second parameter group are included in subjects of differentiation in the model expression.

According to the vehicle control apparatus according to the first aspect of the invention, the first parameter group, to which the parameters belong that oscillate at a frequency higher than the first frequency, is excluded from the subjects of differentiation with respect to time, so that it is possible to prevent high-frequency noise from being amplified in the process in which the output of the model expression, that is, the desired controlled variable value of the actuator installed in the vehicle is calculated. In addition, because the second parameter group, to which the parameters belong that oscillate at a frequency lower than the second frequency lower than the first frequency, is included in the subjects of differentiation with respect to time, it is possible to ensure the accuracy of calculation using the model expression. Thus, with the vehicle control apparatus according to the first aspect, it is possible to favorably reduce superposition of large noise on the desired controlled variable value of the actuator installed in the vehicle without impairing response of the system.

In the model expression, every derivative portion of the predetermined parameter of the first parameter group may be approximated to zero.

With this vehicle control apparatus, it is possible to limit the parameters that are differentiated with respect to time to the parameters that belong to the second parameter group in the model expression.

In the model expression, every derivative portion, in which one of the part of the predetermined parameters that belong to the first parameter group is differentiated with respect to time, may be transformed into a product of a first derivative portion, in which the one of the part of the predetermined parameters that belong to the first parameter group is differentiated with respect to one of the remaining part of the predetermined parameters that belong to the second parameter group, and a second derivative portion, in which the one of the remaining part of the predetermined parameters that belong to the second parameter group is differentiated with respect to time.

With this vehicle control apparatus, it is avoided that the parameters that oscillate at high frequencies and therefore belong to the first parameter group are differentiated with respect to time, so that it is possible to favorably reduce superposition of large noise on the desired controlled variable value of the actuator installed in the vehicle. In addition, the parameters that oscillate at low frequencies and therefore belong to the second parameter group are differentiated with respect to time, so that it is possible to ensure the accuracy of calculation using the model expression.

One of the predetermined parameters that belongs to the first parameter group may be engine speed.

A second aspect of the invention relates to a vehicle control apparatus. This vehicle control apparatus uses a model expression, of which inputs include predetermined parameters and a desired controlled object value of a controlled object in a vehicle, to calculate a desired controlled variable value of an actuator installed in a vehicle that is required to control the controlled object to the desired controlled object value. In the model expression, the desired controlled object value is included in subjects of differentiation, and, of the predetermined parameters, every parameter that oscillates at a frequency higher than a predetermined frequency is excluded from the subjects of differentiation.

According to the vehicle control apparatus according to the second aspect of the invention, the desired controlled object value of the controlled object in the vehicle is included in the subjects of differentiation, so that it is possible to favorably ensure the accuracy of calculation using the model expression. In addition, of the predetermined parameters, other than the desired controlled object value, that are inputted into the model expression, every parameter that oscillates at a frequency higher than the predetermined frequency is excluded from the subjects of differentiation, so that it is possible to prevent high-frequency noise from being amplified in the process in which the output of the model expression, that is, the desired controlled variable value of the actuator installed in the vehicle is calculated. Thus, with the vehicle control apparatus according to the second aspect of the invention, it is possible to favorably reduce superposition of large noise on the desired controlled variable value of the actuator installed in the vehicle without impairing response of the system.

In the model expression, every derivative portion, in which one of the predetermined parameters that oscillates at a frequency higher than the predetermined frequency is differentiated with respect to time, may be approximated to zero.

With this vehicle control apparatus, of the predetermined parameters, every parameter that oscillates at a relatively high frequency is excluded from the subjects of differentiation in the model expression.

The model expression may be obtained as an inverse function of an expression with which the desired controlled object value is calculated by inputting the desired controlled variable value of the actuator installed in the vehicle into a first order lag element with a time constant containing at least part of the predetermined parameters.

With the vehicle control apparatus, because the expression is used with which the desired controlled object value is calculated by inputting the desired controlled variable value of the actuator installed in the vehicle into the first order lag element with the time constant containing at least part of the predetermined parameter, even when the predetermined parameter, such as the intake air pressure $P_m$, contained in the time constant varies depending on the conditions of the vehicle, such as the operational conditions of the internal combustion engine, it is possible to easily determine characteristics of the response of the controlled object to the adjustment of the actuator installed in the vehicle if the time constant is determined by obtaining the value of the parameter contained in the time constant at every time point when the vehicle is in certain conditions. On top of that, the model expression is defined as the inverse function of such an expression, it becomes possible to obtain the desired controlled variable value of the actuator installed in the vehicle that is required to achieve good response of the controlled object by inputting the desired controlled variable value of the actuator installed in the vehicle into the first order lead element with the above-described time constant.

In the model expression, what is multiplied by the time constant and is therefore included in the subjects of differentiation may be limited to the desired controlled object value.

With this vehicle control apparatus, it is possible to exclude the parameters that oscillate at relatively high frequencies from the subjects of differentiation while maintaining good accuracy of calculation using the model expression, in the first order lead element. Thus, it is possible to favorably reduce superposition of large noise on the desired controlled variable value of the actuator installed in the vehicle without impairing response of the system.

The desired controlled object value may be a desired torque value or a desired in-cylinder air amount value of an internal combustion engine.

With this vehicle control apparatus, it is possible to construct a system in which superposition of large noise on the desired controlled variable value of the actuator installed in the vehicle is favorably reduced without impairing response of the torque or the in-cylinder air amount of the internal combustion engine.

The desired controlled object value may contain a first desired torque value, which requires, of the actuator, a response within a first response time, and a second desired torque value, which requires, of the actuator, a response within a second response time longer than the first response time. The vehicle control apparatus may generate a final desired controlled object value by differentiating only the first desired torque value of the desired controlled object value and then summing a thus obtained derivative of the first desired torque value and the second desired torque value.

With this vehicle control apparatus, it is possible to deal with the case where two desired torque values that require different responses are simultaneously inputted, while favorably reducing the calculation load of the vehicle control apparatus.

One of the predetermined parameters that oscillates at a frequency higher than the predetermined frequency may be engine speed.

The actuator installed in the vehicle may be a throttle valve that is disposed in an intake passage of an internal combustion engine and driven by a motor.

With this vehicle control apparatus, superposition of large noise on the desired controlled variable value of the throttle valve driven by a motor is favorably reduced, and it is possible to ensure good durability of the motor.

A third aspect of the invention relates to a method of controlling a desired value of a controlled variable of an actuator installed in a vehicle. The control method includes: receiving predetermined parameters; dividing the predetermined parameters into a first parameter group, to which the parameters belong that oscillate at a frequency higher than a first frequency, and a second parameter group, to which the parameters belong that oscillate at a frequency lower than a second frequency that is lower than the first frequency; and differentiating only the parameters that belong to the second parameter group with respect to time.

A fourth aspect of the invention relates to a method of controlling a desired value of a controlled variable of an actuator installed in a vehicle. The control method includes: receiving predetermined parameters and a desired controlled object value of a controlled object in a vehicle; including the desired controlled object value in subjects of differentiation; and excluding, of the predetermined parameters, every parameter that oscillates at a frequency higher than a predetermined frequency from the subjects of differentiation.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
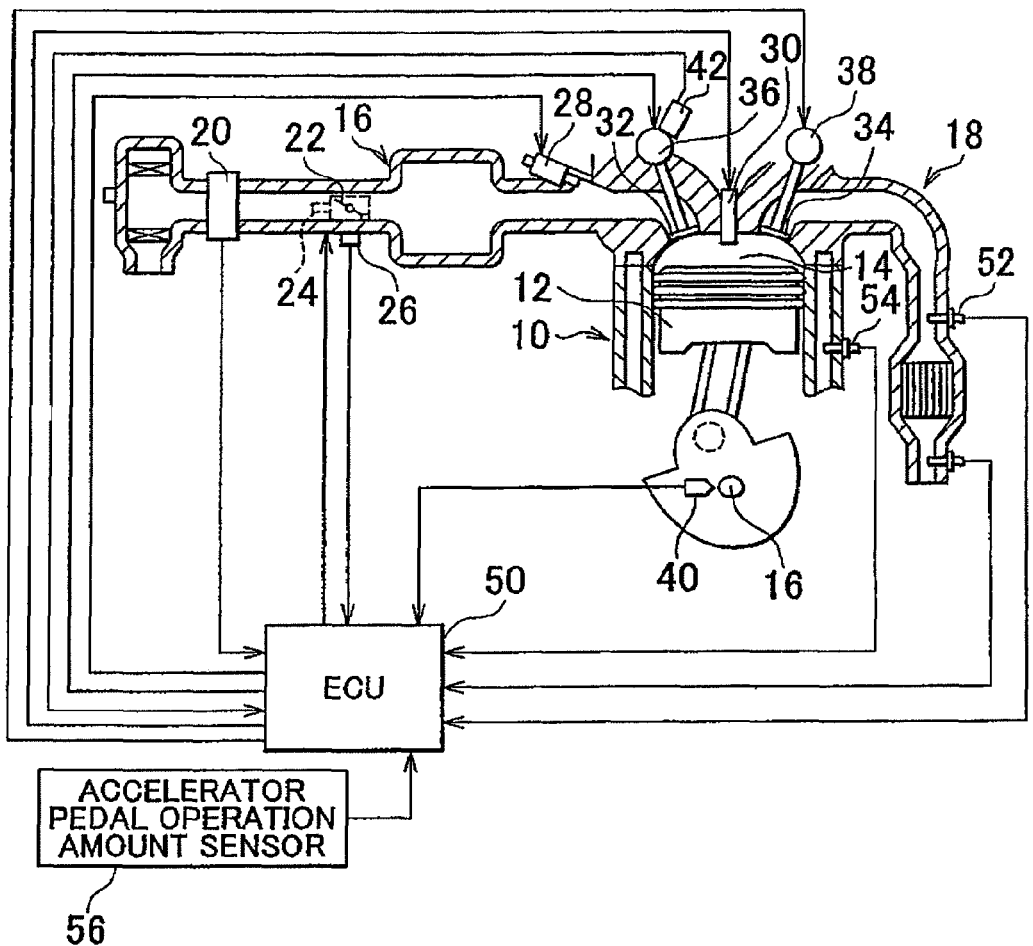
FIG. 1 is a diagram for describing a configuration of an internal combustion engine system included in a vehicle control apparatus of a first embodiment of the invention.

FIG. 1 is a diagram for describing a configuration of an internal combustion engine system included in a vehicle control apparatus according to a first embodiment of the invention. The system according to this embodiment includes a multi-cylinder internal combustion engine 10. In each of cylinders of the internal combustion engine 10, a piston 12 is provided. In addition, in each of the cylinders of the internal combustion engine 10, a combustion chamber 14 is formed on the head side of the piston 12. An intake passage 16 and an exhaust passage 18 are connected to the combustion chamber 14.

An air flow meter 20 that outputs a signal corresponding to the flow rate of air taken into the intake passage 16 is provided near the inlet of the intake passage 16. A throttle valve 22 is provided downstream of the air flow meter 20. The throttle valve 22 is an electronically-controlled valve that is driven by a throttle motor 24 according to the accelerator pedal operation amount. A throttle position sensor 26 for detecting the throttle valve opening degree $\theta$ is disposed near the throttle valve 22.

A fuel injection valve 28 for injecting fuel toward the intake port of the internal combustion engine 10 is disposed downstream of the throttle valve 22. The internal combustion engine includes a cylinder head, in which a spark plug 30 is provided for each of the cylinders so as to protrude from the top portion of the combustion chamber 14 into the combustion chamber 14. The intake port and the exhaust port are provided with an intake valve(s) 32 and an exhaust valve(s) 34, respectively, that cause the combustion chamber 14 to communicate with and to be shut off from the intake passage 16 and the exhaust passage 18, respectively.

The intake valve 32 and the exhaust valve 34 are driven by a variable intake valve (Variable Valve Timing (VVT)) system 36 and a variable exhaust valve (VVT) system 38, respectively. The variable valve timing systems 36 and 38 open and close the intake valve(s) 32 and the exhaust valve(s) 34 in synchronization with the rotation of a crankshaft, and vary the open/close timing of the intake valve(s) 32 and the exhaust valve(s) 34, respectively.

The internal combustion engine 10 is provided with a crank angle sensor 40 near the crankshaft. The crank angle sensor 40 is a sensor that switches between Hi output and Lo output every time the crankshaft rotates by a predetermined rotation angle. With the use of the output from the crank angle sensor 40, it is possible to detect the rotational position of the crankshaft and the rotational speed thereof (engine speed ne). The internal combustion engine 10 is provided with a cam angle sensor 42 near an intake camshaft. The cam angle sensor 42 is a sensor having a configuration similar to that of the crank angle sensor 40. With the use of the output from the cam angle sensor 42, it is possible to detect the rotational position of the intake camshaft (valve timing vvt), for example.

The system shown in FIG. 1 includes an ECU (Electronic Control Unit) 50. Connected to the ECU 50 are, in addition to the above-described various sensors, an air-fuel ratio sensor 52 for detecting the air-fuel ratio of the exhaust gas in the exhaust passage 18, a water temperature sensor 54 for sensing temperature of cooling water in the internal combustion engine 10, and an accelerator pedal operation amount sensor 56 for detecting the accelerator pedal operation amount PA. The above-described various actuators are also connected to the ECU 50. The ECU 50 controls the operation of the internal combustion engine 10 based on the outputs from the sensors and the result of calculation using mathematical models (an intake system model and the inverse model thereof, which will be described later) virtually constructed in the ECU 50.

Figure 2:
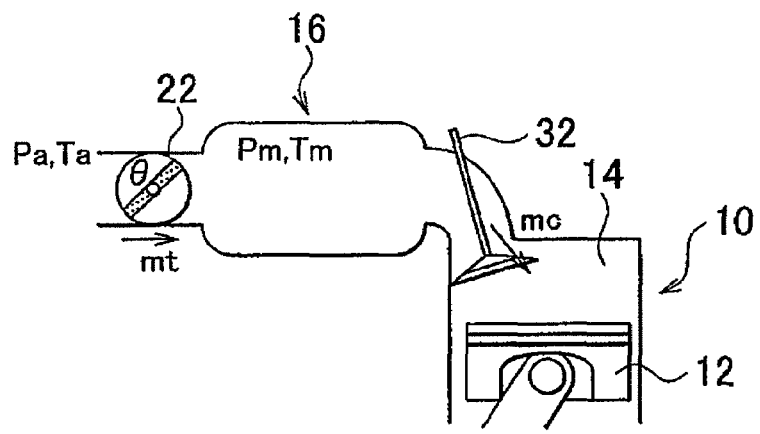
FIG. 2 is a diagram for describing an outline of an intake system model constructed in an ECU shown in FIG. 1.

FIG. 2 is a diagram for describing an outline of the intake system model constructed in the ECU 50 shown in FIG. 1. The intake system model is a mathematical model for estimating the amount of air taken into a cylinder (in-cylinder charged air amount, or intake-valve passing-through air amount) mc. More specifically, the intake system model includes: a throttle model for estimating the amount $m_t$ of air that passes through the throttle valve 22 (throttle-valve passing-through air amount); an intake pipe model for estimating the intake air pressure $P_m$ (and the intake air temperature $T_m$) in the intake passage 16 (intake manifold) downstream of the throttle valve 22; and an intake valve model for estimating the amount $m_c$ of air (intake-valve passing-through air amount, or in-cylinder charged air amount) that passes through the intake valve 32. The throttle-valve passing-through air amount $m_t$, the intake air pressure $P_m$, and the in-cylinder charged air amount $m_c$ can be calculated using the following expressions.

The throttle-valve passing-through air amount $m_t$ (g/sec) is expressed by the product of a coefficient $f_{mt}(\theta)$ and a coefficient $g_{mt}(P_m)$ as shown by the following expression (1).

$$m_t = f_{mt}(\theta) g_{mt}(P_m) \tag{1}$$

In the above expression (1), $f_{mt}(\theta)$ is a coefficient obtained based on the relation shown in FIG. 3A described below, and $g_{mt}(P_m)$ is a coefficient obtained based on the relation shown in FIG. 3B described below.

Figure 3A:
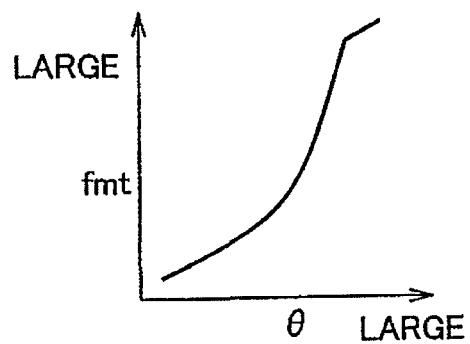
FIGS. 3A and 3B individually show characteristics of maps that are stored in the ECU to obtain $f_{mt}(\theta)$ and $g_{mt}(P_m)$.
Figure 3B:
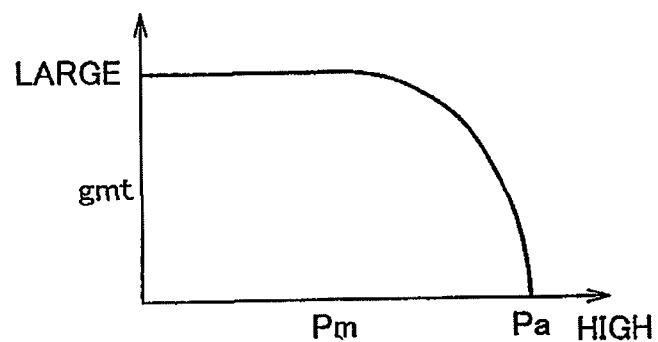

FIGS. 3A and 3B show the characteristics of the maps stored in the ECU 50 to obtain $f_{mt}(\theta)$ and $g_{mt}(P_m)$. As shown in FIG. 3A, the value of the coefficient $f_{mt}(\theta)$ is uniquely determined based on the throttle valve opening degree $\theta$, and has a characteristic such that the greater the throttle valve opening degree $\theta$ is, the higher the value of the coefficient $f_{mt}$ is, in principle. With the use of such a characteristic, it is possible to obtain the result of calculation such that the greater the throttle valve opening degree $\theta$ is, the greater the throttle-valve passing-through air amount $m_t$ is. On the other hand, as shown in FIG. 3B, the value of the coefficient $g_{mt}(P_m)$ is uniquely determined based on the intake air pressure $P_m$. The coefficient $g_{mt}(P_m)$ has a characteristic such that the lower the intake air pressure $P_m$ is below the upstream-of-the-throttle-valve air pressure (atmospheric pressure) Pa, the greater the value of the coefficient $g_{mt}(P_m)$ is, until the intake air pressure $P_m$ falls below a certain value. With the use of such a characteristic of $g_{mt}(P_m)$, it is possible to obtain the result of calculation such that the greater the difference in pressure between upstream and downstream of the throttle valve 22 is, the greater the throttle-valve passing-through air amount $m_t$ is.

The intake air pressure $P_m$ (Pa) and the intake air temperature $T_m$ (K) can be calculated by solving the following expressions (2a) and (2b).

$$\frac{d}{dt}\left(\frac{P_m}{T_m}\right) = \frac{R}{V_m}(m_t - m_c) \tag{2a}$$

$$\frac{dP_m}{dt} = \kappa \frac{R}{V_m}(m_t T_a - m_c T_m) \tag{2b}$$

In the above expressions (2a) and (2b), R is the gas constant, $V_m$ is the intake air manifold volume in the internal combustion engine 10, and $\kappa$ is the specific heat ratio.

The in-cylinder charged air amount $m_c$ (g/sec) is expressed by the following expression (3).

$$m_c = \frac{T_a}{T_m} g_{mc}(P_m, ne, vvt) \tag{3}$$

In the above expression (3), the coefficient $g_{mc}$ is a function of the intake air pressure $P_m$, the engine speed ne, and the valve timing vvt, and $T_a$ is the upstream-of-the-throttle-valve air temperature (atmospheric temperature) $T_a$.

Figure 4:
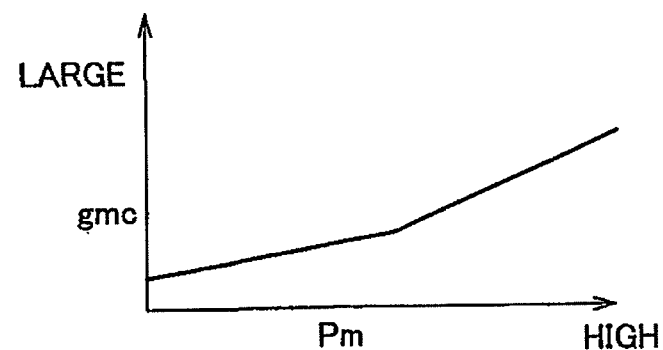
FIG. 4 shows characteristics of a map stored in the ECU to obtain $g_{mc}(P_m, ne, vvt)$.

FIG. 4 shows the characteristics of the maps stored in the ECU 50 to obtain $g_{mc}(P_m, ne, vvt)$. More specifically, the ECU 50 stores maps that define the coefficient $g_{mc}$ in relation to the intake air pressure $P_m$ as shown in FIG. 4 for each set of the values of the engine speed ne and the valve timing vvt. The map shown in FIG. 4 has a characteristic such that the higher the intake air pressure $P_m$ is, the greater the value of the variable $g_{mt}$ is. With the use of such a characteristic of the variable $g_{mc}$, it is possible to obtain the result of calculation such that the higher the intake air pressure $P_m$ is, the greater the in-cylinder charged air amount $m_c$ is.

With the above-described expressions (1) to (3), when the intake air pressure $P_m$ is obtained using the above expression (2), the throttle-valve passing-through air amount $m_t$ at a certain throttle valve opening degree $\theta$ is determined based on the above expression (1), and the in-cylinder charged air amount $m_c$ is determined based on the above expression (3). When the latest values of $m_t$ and $m_c$ are obtained, it becomes possible to obtain the subsequent intake air pressure $P_m$. By repeating such a calculation, it is possible to successively calculate the in-cylinder charged air amount $m_c$.

The efficiency $kl_c$ with which the air taken into a cylinder is charged can be calculated using the following expression (4) based on the in-cylinder charged air amount $m_c$ obtained as described above.

$$kl_c = m_c \frac{1}{ne/60} \frac{1}{Vc \cdot \rho_{air}} \equiv m_c \frac{K_t}{ne} \tag{4}$$

In the above expression (4), Vc is the cylinder volume, $\rho_{air}$ is the air density, Kt is a coefficient that collectively represents the parameters other than $m_c$ and ne.

Calculation of the desired throttle opening degree $\theta_{ref}$ using the inverse model of the intake system model will be described. In the system according to the present embodiment, torque demand control is performed in which the actual torque of the internal combustion engine 10 is controlled so that the torque actually required (desired torque value $trq_{ref}$) is obtained based on, for example, the operation amount of the accelerator pedal operated by a driver. The system according to the present embodiment is characterized in that the desired throttle valve opening degree $\theta_{ref}$ that brings about the desired torque value $trq_{ref}$ according to the driver's demand is calculated by the method described later with reference to FIGS. 9A to 9C, using the inverse model expressions obtained by transforming the above-described intake system model expressions.

Figure 5:
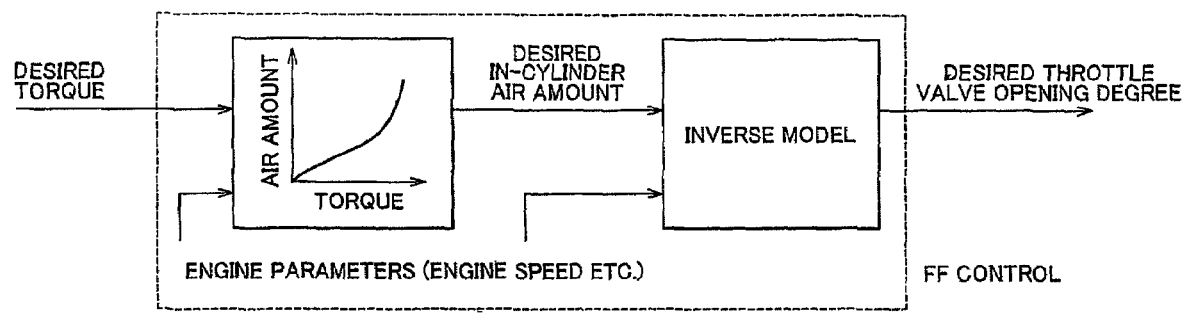
FIG. 5 is a diagram for describing a process in which a desired throttle valve opening degree $\theta_{ref}$ is obtained from a desired torque value $trq_{ref}$ of an internal combustion engine in a method that is referred to for the purpose of comparison with a method according to the first embodiment.

First, for the purpose of comparison with the present embodiment, a method that is related art of this embodiment and in which the desired throttle valve opening degree $\theta_{ref}$ is calculated by inversely solving the above-described intake system model expressions, will be described with reference to FIG. 5. FIG. 5 is a diagram for describing a process in which the desired throttle valve opening degree $\theta_{ref}$ is obtained from the desired torque value $trq_{ref}$ of the internal combustion engine 10 in the related art.

In the method shown in FIG. 5, the desired value of the in-cylinder air amount that is required to achieve the desired torque value $trq_{ref}$ is acquired based on the torque maps that define the relation between the desired torque value $trq_{ref}$ and the desired in-cylinder air amount value ($kl_{cref}$ or $m_{cref}$) of the internal combustion engine 10. More specifically, the torque map is a map that defines the desired in-cylinder air amount value in the form of the desired charging efficiency $kl_{cref}$ in relation to the desired torque value for each set of predetermined engine parameters, such as the engine speed ne and the ignition timing SA. It should be noted that either of the desired charging efficiency $Kl_{cref}$ and the desired in-cylinder air amount $m_{cref}$ can be used as the index representing the desired value of the in-cylinder air amount, and the desired value of the in-cylinder air amount may therefore be acquired from the torque maps in the form of either of $kl_{cref}$ and $m_{cref}$.

In the method shown in FIG. 5, the following inverse model expressions (5) to (9) are derived by transforming the above-described intake system model expressions (1) to (4). Then, the desired throttle valve opening degree $\theta_{ref}$ required to achieve the desired in-cylinder air amount value is calculated with the use of the inverse model expressions, using as inputs the desired charging efficiency $kl_{cref}$ acquired from the torque map and the predetermined engine parameters, such as the engine speed ne.

More specifically, the following expression (5) is obtained by transforming the above expression (4) so that the left-hand side has the in-cylinder charged air amount $m_c$ only. With this expression (5), it is possible to obtain the desired in-cylinder air amount $m_{cref}$ based on the desired charging efficiency $kl_{cref}$.

$$m_{cref} = \frac{ne}{K_t} kl_{cref} \quad (5)$$

When the above expression (3) is transformed so that the left-hand side has the intake air pressure $P_m$ only, the following expression (6) is obtained. With this expression (6), it is possible to obtain the desired intake air pressure $P_{mref}$ based on the desired in-cylinder air amount $m_{cref}$ and the expression (9b) described later.

$$P_{mref} = g_{mc}^{-1}\left(\frac{T_{mref}}{T_a} m_{cref}, ne, vvt\right) \quad (6)$$

When the above expression (2b) is transformed so that the left-hand side has the throttle-valve passing-through air amount $m_t$ only, the following expression (7) is obtained. With this expression (7), it is possible to obtain the desired throttle-valve passing-through air amount $m_{tref}$ based on the desired in-cylinder air amount $m_{cref}$ and the desired intake air pressure $P_{mref}$.

$$m_{tref} = \frac{V_m}{\kappa R T_a} \frac{dP_{mref}}{dt} + m_{cref} \frac{T_m}{T_a} \quad (7)$$

When the above expression (1) is transformed so that the left-hand side has the throttle valve opening degree $\theta$ only, the following expression (8) is obtained. With this expression (8), it is possible to obtain the desired throttle valve opening degree $\theta_{ref}$ based on the desired intake air pressure $P_{mref}$ and the desired throttle-valve passing-through air amount $m_{tref}$.

$$\theta_{ref} = f_{mt}^{-1}\left(\frac{m_{tref}}{g_{mt}(P_{mref})}\right) \quad (8)$$

The following expression (9a) is obtained by integrating both sides of the above expression (2a). With the following expression (9b), it is possible to obtain the desired intake air temperature $T_{mref}$ from the desired intake air pressure $P_{mref}$ that is obtained using the above expression (6), and the desired value of the $P_m/T_m$ that is obtained using the expression (9a).

$$\left(\frac{P_m}{T_m}\right)_{ref} = \int \frac{R}{V_m}(m_{tref} - m_{cref})dt \quad (9a)$$

$$T_{mref} = P_{mref} / \left(\frac{P_m}{T_m}\right)_{ref} \quad (9b)$$

With the method shown in FIG. 5 described above, it is possible to construct a feed forward (FF) controller in which the dynamics of the intake system, such as the delay in the response of air intake, is taken into consideration. Next, with reference to FIGS. 6A and 6B, and 7A and 7B, advantageous effects will be described that are achieved when the in-cylinder air amount is controlled based on the desired throttle valve opening degree $\theta_{ref}$ that is calculated using the inverse model expressions described in connection with the related art.

Figure 6A:
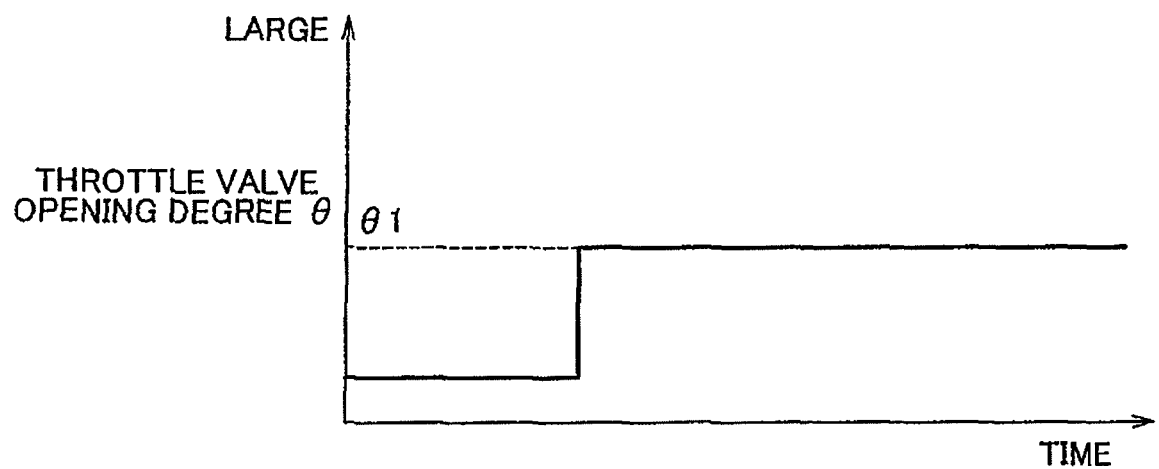
FIGS. 6A and 6B are diagrams showing an example in which FF control is performed in which dynamics of the intake system is not taken into consideration.
Figure 6B:
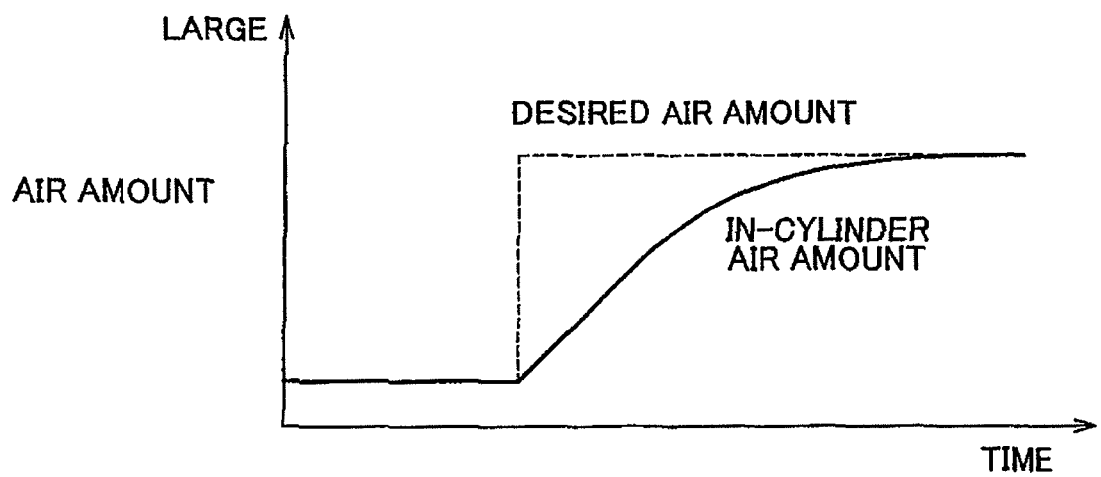

FIGS. 6A and 6B are diagrams showing an example in which FF control is performed in which the dynamics of the intake system is not taken into consideration. In other words, FIGS. 6A and 6B are diagrams illustrating the related art of the invention. In this case, when a demand for torque is made, the throttle valve opening degree $\theta$ is controlled to the value $\theta_1$ that enables the desired in-cylinder air amount value to be achieved as shown in FIG. 6A. As a result, the in-cylinder air amount gradually gets close to the desired value with a delay in the response of air intake as shown in FIG. 6B, and therefore, good torque response is not achieved.

Figure 7A:
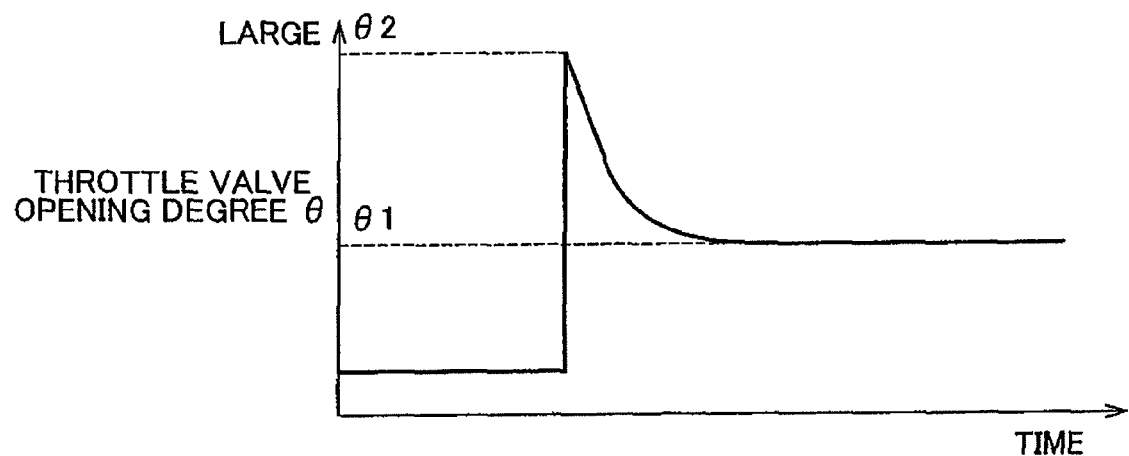
FIGS. 7A and 7B are diagrams showing an example in which FF control is performed according to the method shown in FIG. 5 in which the dynamics of the intake system is taken into consideration.
Figure 7B:
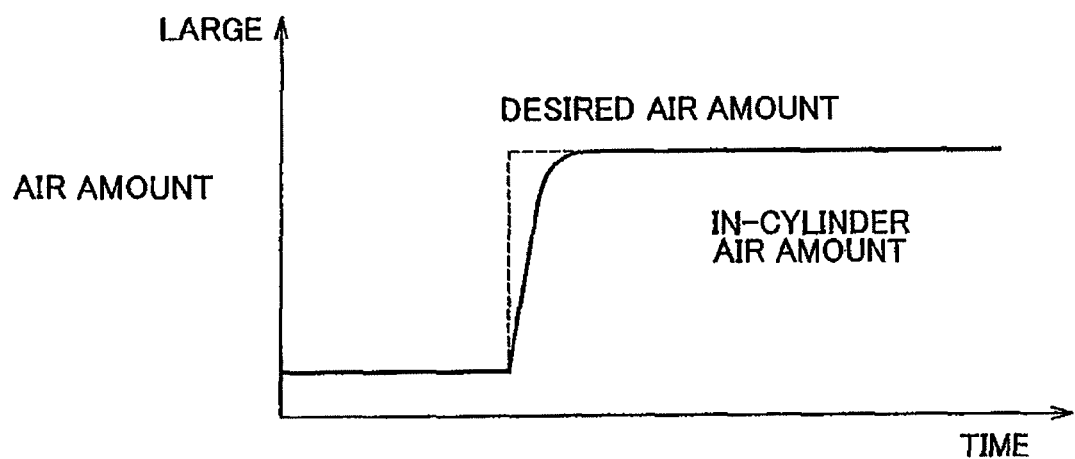

FIGS. 7A and 7B are diagrams showing an example in which FF control is performed according to the method shown in FIG. 5 in which the dynamics of the intake system is taken into consideration. In other words, FIGS. 7A and 7B are diagrams illustrating the related art of the invention. In this case, when a demand for torque is made, as shown in FIG. 7A, in order to immediately achieve the desired in-cylinder air amount value (≈desired torque value), the desired throttle valve opening degree $\theta_{ref}$ is determined so that the throttle valve opening degree becomes equal to a throttle valve opening degree $\theta_2$ that is greater than a throttle valve opening degree $\theta_1$ that is required to achieve the desired in-cylinder air amount value. After that, the desired throttle valve opening degree $\theta_{ref}$ that is required to immediately achieve the desired in-cylinder air amount value is successively calculated. As a result, good response of the in-cylinder air amount with respect to the desired in-cylinder air amount value is achieved as shown in FIG. 7B.

Figure 8A:
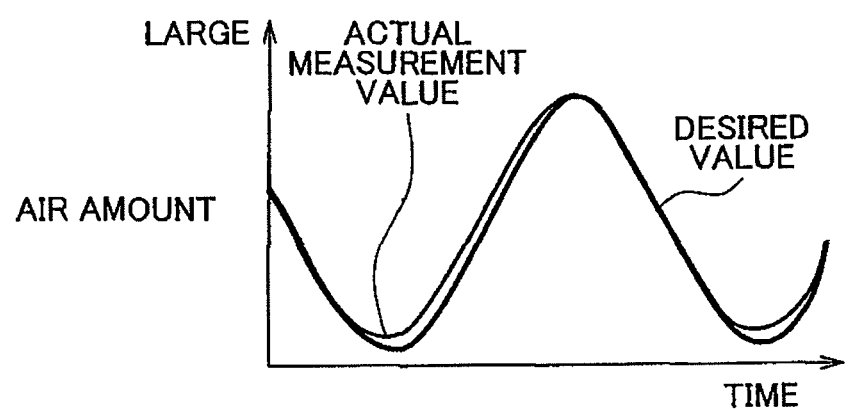
FIGS. 8A and 8B are diagrams for describing problems with the method shown in FIG. 5.
Figure 8B:
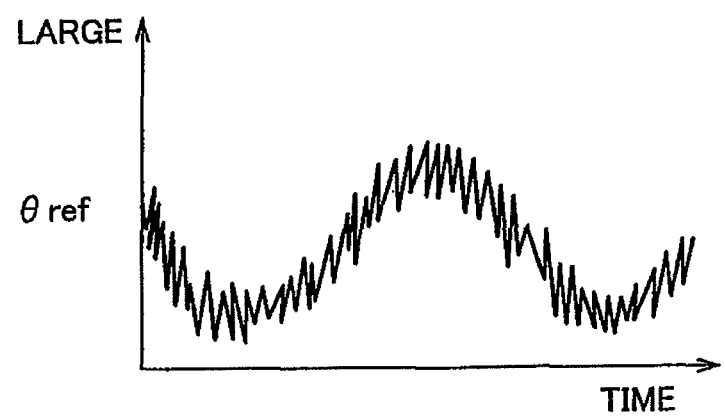

FIGS. 8A and 8B are diagrams for describing problems with the method shown in FIG. 5. More specifically, FIG. 8A shows a waveform of the desired in-cylinder air amount value that is periodically varied. FIG. 8B shows a waveform of the desired throttle valve opening degree $\theta_{ref}$ that is successively calculated to continuously achieve such a desired in-cylinder air amount value. When the throttle valve opening degree $\theta$ is controlled to such a desired throttle valve opening degree $\theta_{ref}$, the in-cylinder air amount that accurately follows the desired in-cylinder air amount value is obtained as shown in FIG. 8A.

However, as shown in FIG. 8B, large noise is superposed on the desired throttle valve opening degree $\theta_{ref}$ that is the final command value sent to the throttle motor 24. The cause of this is as follows. Specifically, the above expression (7) for obtaining the desired throttle-valve passing-through air amount $m_{tref}$ contains the term obtained by differentiating the desired intake air pressure $P_{mref}$ with respect to time. The above-described expression (6) for obtaining the desired intake air pressure $P_{mref}$ contains measured values (engine parameters), such as the engine speed ne, that tend to oscillate and the signals indicative of which tend to be superposed with high frequency noise. Thus, when the desired intake air pressure $P_{mref}$ in the expression (7) is differentiated with respect to time, the high frequency noise superposed on the engine parameters contained in the desired intake air pressure $P_{mref}$ is amplified. Because of this reason and the fact that the calculation value tends to oscillate due to the presence of recursive calculations involving the above expression (9b) and the above expression (6), the desired throttle valve opening degree $\theta_{ref}$ tends to be superposed with large noise.

When large noise is superposed on the desired throttle valve opening degree $\theta_{ref}$, which is a command value sent to the throttle motor 24, the throttle motor 24 is frequently controlled with fine control values, which results in increase in the amount of heat generated by the throttle motor 24. Increase in the heat generation amount can result in increase in the load on the throttle motor 24. When the throttle valve 22 is frequently operated with the fine control values, the load on the throttle valve 22 can also increase.

Figure 9A:
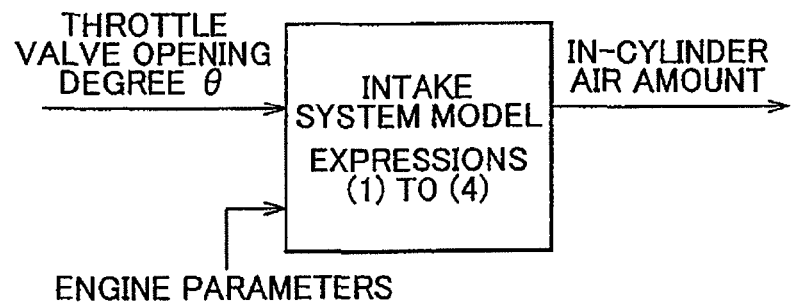
FIGS. 9A to 9C are diagrams for describing a method that is used, in the first embodiment, to calculate a desired throttle valve opening degree $\theta_{ref}$ that is required to achieve a desired in-cylinder air amount value.
Figure 9A:
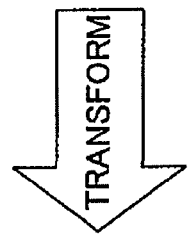
Figure 9B:
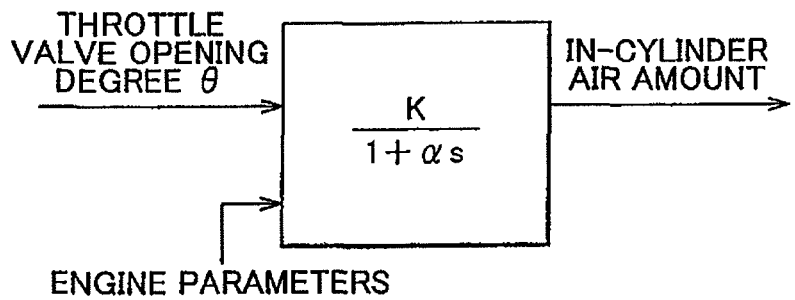
Figure 9B:
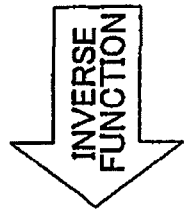
Figure 9C:
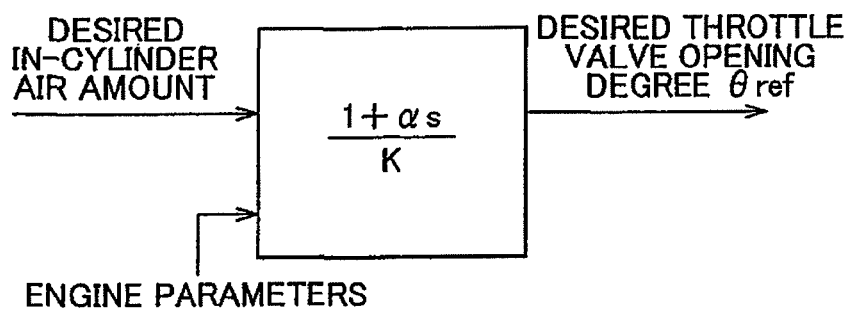

FIGS. 9A to 9C are diagrams for describing the method that is used, in the first embodiment, to calculate the desired throttle valve opening degree $\theta_{ref}$ that is required to achieve the desired in-cylinder air amount value. The method of the present embodiment shown in FIGS. 9A to 9C is the same as the method that is shown in FIG. 5 for the comparison purpose in that the above-described intake system model expressions (1) to (4) are used. However, in the method shown by FIGS. 9A to 9C, instead of merely inversely solving the intake system model expressions, the intake system model expressions are used after transforming and approximating the intake system model expressions into the state-dependent linear model (differential equations) as described below.

More specifically, as shown in FIG. 9A, with the intake system model, as already described, it is possible to obtain the in-cylinder charged air amount $m_c$ by inputting, in addition to the throttle valve opening degree $\theta$, other engine parameters, such as the engine speed ne and the ignition timing SA. In the method shown in FIGS. 9A to 9C, the above-described intake system model expressions are transformed into the expressions including the simple transfer function $K/(1+\alpha s)$ as shown in FIG. 9B in which the state-dependent coefficient $\alpha$ is used.

With the above-described state-dependent linear model using the transfer function $(K/(1+\alpha s))$, it is possible to obtain the in-cylinder air amount when the throttle valve opening degree $\theta$ and the predetermined engine parameters are given as the inputs to the model. Additionally, in the method shown in FIGS. 9A to 9C, the inverse function of the above simple transfer function $(K/(1+\alpha s))$ is used to obtain the desired value $\theta_{ref}$ of the throttle valve opening degree required to achieve the desired in-cylinder air amount value as shown in FIG. 9C.

Next, description will be given of transforming the intake system model expressions shown in FIG. 9A into the expressions including the transfer function $(K/(1+\alpha s))$ shown in FIG. 9B. First, the expression (2b) can be expressed by the following expression (10a) by using the atmospheric temperature Ta as the approximation of the intake air temperature $T_m$ in the intake system model expression (2b). In addition, the expression (3) can be expressed by the following expression (10b) by using the atmospheric temperature Ta as the approximation of the intake air temperature $T_m$ in the expression (3) similarly.

$$\frac{dP_m}{dt} = \kappa \frac{RT_a}{V_m}(m_t - m_c) \quad (10a)$$

$$m_c = g_{mc}(P_m, ne, vvt) \quad (10b)$$

Next, with the use of the above expressions (1) to (4) along with the above expressions (10a) and (10b), a differential equation for the charging efficiency $kl_c$, expressed by the following expression (11d), is obtained through the process as described below.

$$\frac{dkl_c}{dt} = \frac{d}{dt}\left(m_c \frac{K_t}{ne}\right) \quad (11a)$$

$$\approx \frac{K_t}{ne}\frac{dm_c}{dt} \leftarrow \text{approximation is made by regarding} \quad (11b)$$

$$\frac{dne}{dt} \text{ as zero}$$

$$= \frac{K_t}{ne}\frac{dm_c}{dP_m}\frac{dP_m}{dt} \quad (11c)$$

$$= \frac{dg_{mc}}{dP_m}\frac{\kappa RT_a}{V_m}\left(\frac{K_t}{ne}g_{mt}(P_m)f_{mt}(\theta) - kl_c\right) \quad (11d)$$

In this case, first, both sides of the above expression (4) are differentiated with respect to time to obtain the expression (11a). In this operation, dne/dt is regarded as zero to make an approximation of the expression (11a) (specifically, the engine speed ne is treated as a constant). In this way, the engine speed ne is excluded from the subjects of differentiation in the expression (11a), and it is possible to express the expression (11a) as the expression (11b).

Then, the expression (11b) is transformed into the expression (11c) using the intake air pressure $P_m$ as the intermediate variable, and thereafter the above expressions (1), (10a) and (10b) are substituted into the expression (11c) to obtain the expression (11d).

Thereafter, the Laplace transform of the expression (11d) is calculated, in which the charging efficiency $kl_c$ is expressed as Y, and the variable $f_{mt}(\theta)$, which is in one to one relation to the throttle valve opening degree $\theta$, is expressed as X. When the parameters in the calculated Laplace transform are ordered using the variables K and $\alpha$, the expression (11d) is finally expressed by the expressions (12a) and (12b).

$$Y = \frac{K}{1+\alpha_s}X \quad (12a)$$

where $$K = \frac{K_t}{ne}g_{mt}(P_m), \alpha = \frac{V_m}{\kappa RT_a\left(\frac{dg_{mc}}{dP_m}\right)} \quad (12b)$$

With the expressions (12a) and (12b) as calculated above, the relation between the throttle valve opening degree $\theta$ and the desired in-cylinder air amount value (desired charging efficiency $kl_{cref}$) can be expressed as if the first order lag element. More specifically, because the coefficients K and $\alpha$ in the above expressions (12a) and (12b) contain the intake air pressure $P_m$ that is a function of time, the coefficients K and $\alpha$ vary as the intake air pressure $P_m$ varies with time. Specifically, with the expressions (12a) and (12b), the relation between the throttle valve opening degree $\theta$ and the desired in-cylinder air amount value (desired charging efficiency $kl_{cref}$) can be expressed using the simple transfer function $(K/(1+\alpha s))$ that is expressed using the coefficients K and $\alpha$ that depend on the state of the intake air pressure $P_m$.

With the use of such a state-dependent linear model, if a present intake air pressure $P_m$ is determined, the response of air when the throttle valve opening degree $\theta$ is thereafter increased by a certain degree can be simply determined from the value of the time constant $\alpha$ in the above expressions (12a) and (12b). In other words, the delay in the response of air depending on the present intake air pressure $P_m$ is determined based on the simple relational expressions as described above. Thus, it is possible to make it easy to determine characteristics of the response of air to the adjustment of the throttle valve opening degree θ.

When the inverse function of the expression (12a) is calculated to obtain the expression (13a), and the inverse Laplace transform of the expression (13a) is calculated with the variables K and α left, the expression (13b) for calculating the desired throttle valve opening degree $θ_{ref}$ as described below is obtained.

$$X = \frac{1+\alpha s}{K} Y \tag{13a}$$

$$\theta_{ref} = f_{mt}^{-1}\left(K^{-1}(Kl_{cref} + \alpha)\frac{dkl_{cref}}{dt}\right) \tag{13b}$$

With the use of the expression (13b) calculated in this way, the desired value $θ_{ref}$ of the throttle valve opening degree required to achieve the desired in-cylinder air amount value (desired charging efficiency $kl_{cref}$) is obtained. In addition, according to the expression (13a), what is multiplied by the Laplace operator s and is therefore differentiated is Y only, that is, the desired in-cylinder air amount value (charging efficiency $kl_c$) only. Thus, it is possible to exclude, from the subjects of differentiation, the parameters contained in the coefficient α, that is, the engine parameters, other than the desired in-cylinder air amount value, such as the engine speed ne.

Figure 10A:
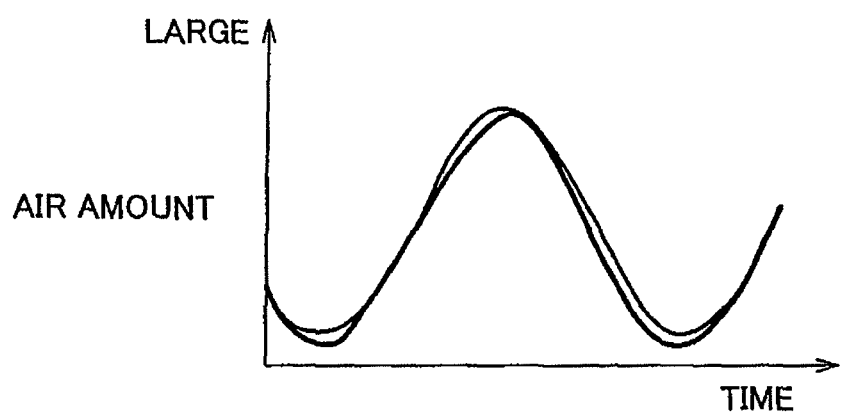
FIGS. 10A and 10B are diagrams for describing advantageous effects achieved by the method shown in FIGS. 9A to 9C.
Figure 10B:
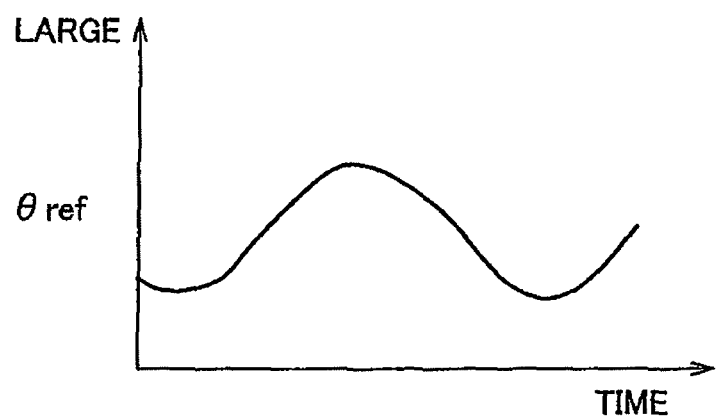

FIGS. 10A and 10B are diagrams for describing advantageous effects achieved by the method shown in FIGS. 9A to 9C. When the desired value $θ_{ref}$ of the throttle valve opening degree required to achieve the desired in-cylinder air amount value is calculated based on the expression (13b) derived as described above, the engine parameters, such as the engine speed ne, having high-frequency oscillatory components are excluded from the subjects of differentiation, and it is therefore possible to prevent high frequency noise from being amplified in the process in which the output (desired throttle valve opening degree $θ_{ref}$) of the model is calculated. In addition, according to the above expression (13b), the desired in-cylinder air amount value ($kl_{cref}$) is included in the subjects of differentiation with respect to time, so that it is possible to ensure the accuracy of calculation using the model expression. Thus, even when the desired in-cylinder air amount value is periodically varied as shown in FIG. 10A, it is possible to favorably eliminate noise from the waveform of the desired throttle valve opening degree $θ_{ref}$ without impairing the response of the system (the response of torque) as shown in FIG. 10B.

In addition, with the method shown in FIGS. 9A to 9C, it is possible to minimize the influence of heat generation of the throttle motor 24 and therefore obtain sufficient durability of the throttle motor 24 without impairing the response of torque (air), in the system in which the torque demand control is used that requires frequent adjustment of the throttle valve opening degree θ in order to achieve the desired torque value $trq_{ref}$ according to the demand made by a driver.

Next, with reference to FIGS. 11, 12A, 12B, 13, 14A, and 14B, a second embodiment of the invention will be described. Control scheme including conversion of a torque value will also be described. According to the method of the above-described first embodiment, it is possible to calculate the desired value $θ_{ref}$ of the throttle valve opening degree required to achieve the desired in-cylinder air amount value while favorably reducing noise. The following control scheme illustrated in FIG. 11 is conceivable as the method of obtaining the desired value $θ_{ref}$ of the throttle valve opening degree required to achieve a desired torque value with the use of the method of the first embodiment.

Figure 11:
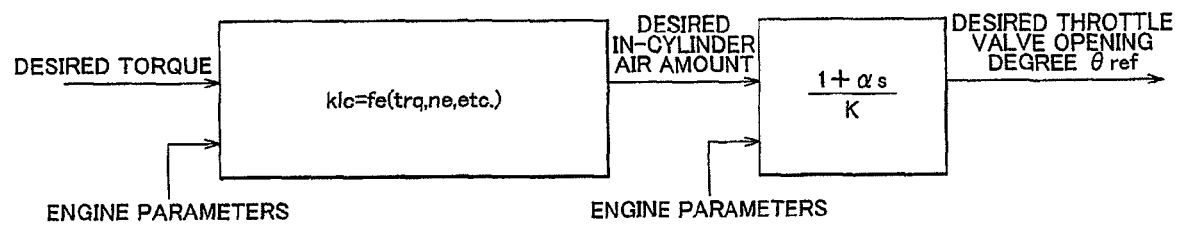
FIG. 11 is a diagram for describing a control scheme including conversion of a torque value, which is referred to for the purpose of comparison with the second embodiment.

FIG. 11 is a diagram for describing the control scheme including conversion of a torque value, which is referred to for the purpose of comparison. More specifically, with regard to the control scheme illustrated in FIG. 11, the charging efficiency $kl_c$ is expressed by the function $f_e$(trq, ne, etc.) of the engine parameters, such as the torque trq and the engine speed ne. After the desired in-cylinder air amount value ($kl_{cref}$ or $m_{cref}$) that brings about the desired torque value $trq_{ref}$ is obtained based on such a relational expression, the desired value $θ_{ref}$ of the throttle valve opening degree is obtained from the desired in-cylinder air amount value according to the method shown in FIGS. 9A to 9C described above.

Figure 12A:
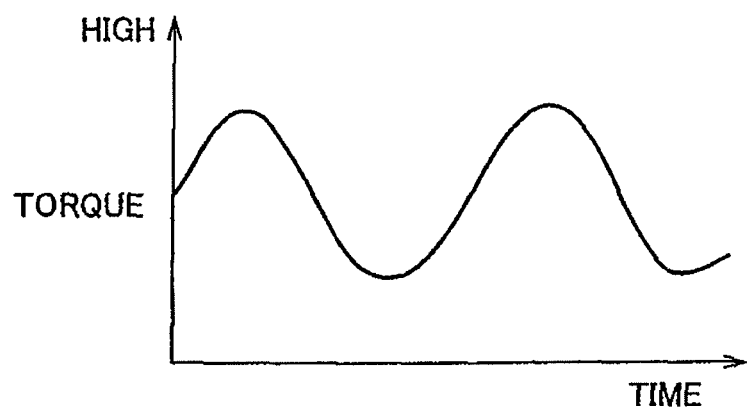
FIGS. 12A and 12B are diagrams for describing problems with the method shown in FIG. 11.
Figure 12B:
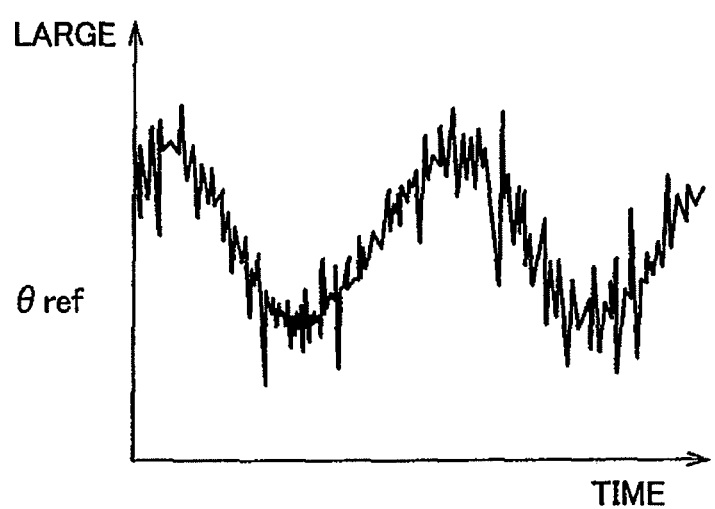

FIGS. 12A and 12B are diagrams for describing problems with the method shown in FIG. 11. The relational expression shown in FIG. 11 involves the engine parameters, such as the engine speed ne, having high-frequency oscillatory components. Thus, as shown in FIG. 12B, large noise is superposed on the desired throttle valve opening degree $θ_{ref}$ that is calculated to achieve the desired torque value $trq_{ref}$ as shown in FIG. 12A. This is because, when the desired in-cylinder air amount value obtained using this relational expression is differentiated in the state-dependent model shown in FIGS. 9A to 9C, the influence of variation in the engine parameters is amplified, and unexpected noise is amplified.

Figure 13:
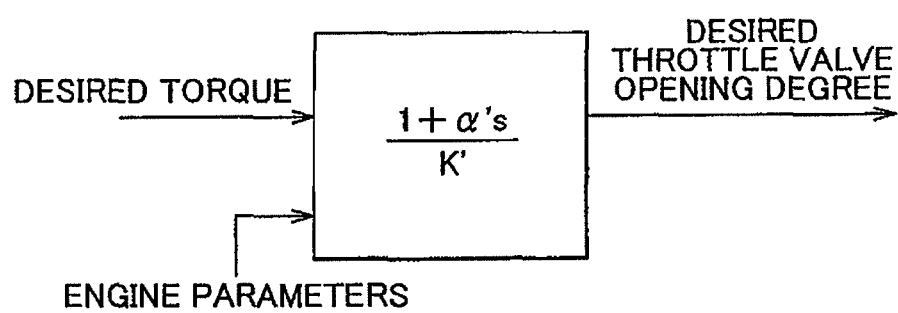
FIG. 13 is a diagram for describing a method that is used, in the second embodiment, to calculate a desired throttle valve opening degree $\theta_{ref}$ that is required to achieve a desired torque value $trq_{ref}$.

FIG. 13 is a diagram for describing the method that is used, in the second embodiment, to calculate the desired throttle valve opening degree $θ_{ref}$ that is required to achieve the desired torque value $trq_{ref}$. In this embodiment, as shown in FIG. 13, in order to solve the above problems, a state-dependent model is constructed that includes the relation between the desired torque value $trq_{ref}$ and the desired in-cylinder air amount value $kl_{cref}$. In addition, in this embodiment, with the use of this model, by inputting the desired torque value $trq_{ref}$ into the first order lead element, the desired throttle valve opening degree $θ_{ref}$ is obtained that is required to achieve a desired torque value $trq_{ref}$.

Also in this model, as in the case of the first embodiment described above, the inputs to the model other than the desired torque value $trq_{ref}$, that is, the engine parameters, such as the engine speed ne, having high-frequency oscillatory components are excluded from the subjects of differentiation. More specifically, in this embodiment, differentiation of the desired in-cylinder air amount value (desired charging efficiency $kl_{cref}$) is approximated to the following expression (14b).

$$\frac{dkl_c}{dt} = \frac{df_e}{dt} = \frac{df_e}{dtrq}\frac{dtrq}{dt} + \frac{df_e}{dne}\frac{dne}{dt} + \frac{df_e}{dSA}\frac{dSA}{dt} + \tag{14a}$$

$$\approx \frac{df_e}{dtrq}\frac{dtrq}{dt} \tag{14b}$$

Because the charging efficiency $kl_c$ is represented by the function $f_c$(trq, ne, etc.) of the torque trq, the engine speed ne, and the ignition timing SA, the derivative of the charging efficiency $kl_c$ with respect to time is expressed by the expression (14a). In this embodiment, of all the parameters that are contained in the expression (14a), derivatives of the parameters other than the torque trq, that is, derivatives of the engine speed ne (dne/dt) etc., having high-frequency oscillatory components, for example, are approximated to zero to obtain the expression (14b).

According to the above expression (14b) obtained in this way, the derivative of the desired in-cylinder air amount value ($dkl_c/dt$) can be expressed as the product of the derivative ($df_e/dtrq$) and the torque derivative ($dtrq/dt$). The derivative ($df_e/dtrq$) can be obtained from the map defined in relation to the torque trq. Thus, with the above expression (14b), it is possible to obtain the derivative ($dkl_c/dt$) of the desired in-cylinder air amount value as the product of the value from the map and the derivative of torque ($dtrq/dt$) with the terms, such as the derivative of the engine speed ne ($dne/dt$), that can be noise sources eliminated.

The state-dependent model shown in FIG. 13 is obtained based on the relations described below. First, the torque trq, the charging efficiency $kl_c=F_e(Y)$, and the function $f_{mt}(\theta)$ are represented by Y, Z, and X. Then, X and Z are substituted into the above expression (13a) to obtain the following expression (15a). Replacing Z in the expression (15a) by $F_e(Y)$ gives the expression (15b).

$$X = \frac{1+\alpha s}{K} Z \quad (15a)$$

$$= \frac{1}{K} \frac{Fe(Y)}{Y} Y + \frac{\alpha}{K} s Fe(Y) \quad (15b)$$

Then, the following expression (16) is obtained by calculating the inverse Laplace transform of the above expression (15b).

$$x = \frac{1}{K} \frac{f_e}{trq} trq + \frac{\alpha}{K} \frac{df_e}{dtrq} \frac{dtrq}{dt} \quad (16)$$

Then, the following expression (17a) is obtained by again calculating the Laplace transform of the above expression (16) and removing Y (torque trq). Ordering this expression (17a) using the following coefficients $\alpha'$ and K' gives the following expression (17b). In this way, the transfer function $((1+\alpha's)/K')$ of the state-dependent model shown in FIG. 13 is obtained.

$$X = \left(\frac{1}{K} \frac{f_e}{trq} + \frac{\alpha}{K} \frac{df_e}{dtrq} s\right) TRQ \quad (17a)$$

$$= \frac{1+\alpha' s}{K'} Y \quad (17b)$$

where $f'_e(trq) \equiv f_e(trq)/trq$ $K' = K/f'_e$ $\alpha' = \alpha \dfrac{df_e}{dtrq} \bigg/ f'_e$ The following expression (18) for calculating the desired throttle valve opening degree $\theta_{ref}$ is obtained by calculating the inverse Laplace transform of the expression (17b).

$$\theta_{ref} = f_{mt}^{-1}\left(K'^{-1}\left(trq_{ref} + \alpha' \frac{dtrq_{ref}}{dt}\right)\right) \quad (18)$$

With the use of the expression (18) calculated in this way, the desired value $\theta_{ref}$ of the throttle valve opening degree required to achieve the desired torque value $trq_{ref}$ is obtained.

In addition, according to the expression (17b), the variable that is multiplied by the Laplace operator s and is therefore differentiated is Y only, that is, the desired torque value $trq_{ref}$ only, and it is therefore possible to exclude the parameters contained in the coefficient $\alpha'$, that is, the engine parameters, such as the engine speed ne, other than the desired torque value $trq_{ref}$, from the subjects of differentiation.

Figure 14A:
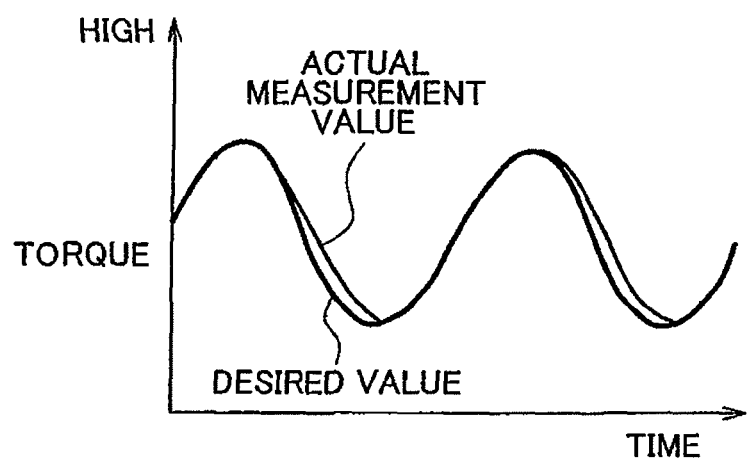
FIGS. 14A and 14B are diagrams for describing advantageous effects achieved by the method shown in FIG. 13.
Figure 14B:
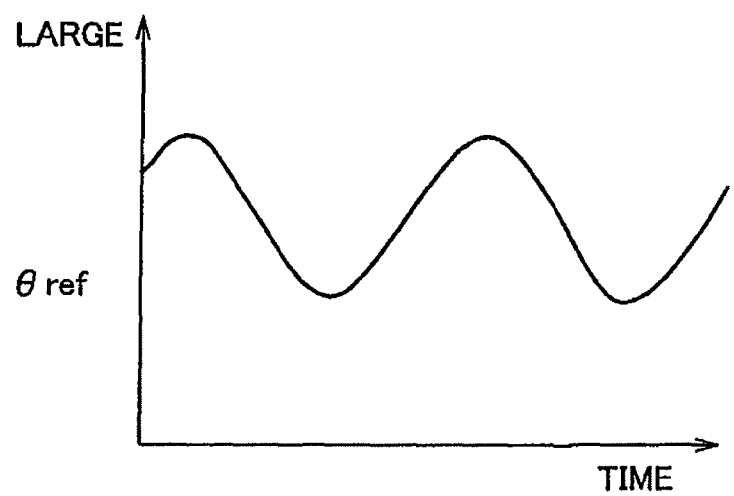

FIGS. 14A and 14B are diagrams for describing advantageous effects achieved by the method shown in FIG. 13. When the desired value $\theta_{ref}$ of the throttle valve opening degree required to achieve the desired torque value $trq_{ref}$ is calculated based on the expression (18) derived as described above, the engine parameters, such as the engine speed ne, having high-frequency oscillatory components are excluded from the subjects of differentiation, and it is therefore possible to prevent high frequency noise from being amplified in the process in which the output (desired throttle valve opening degree $\theta_{ref}$) of the model is calculated. In addition, according to the expression (18), the desired torque value ($trq_{ref}$) is the variable that is differentiated with respect to time, so that it is possible to ensure the accuracy of calculation using the model expression. Thus, even when the desired torque value $trq_{ref}$ is periodically varied as shown in FIG. 14A, it is possible to favorably eliminate noise from the waveform of the desired throttle valve opening degree $\theta_{ref}$ without impairing the response of the system (the response of torque) as shown in FIG. 14B.

In addition, with the method shown in FIG. 13, it is possible to minimize the influence of heat generation of the throttle motor 24 and obtain sufficient durability of the throttle motor 24 without impairing the response of torque, in the system in which the torque demand control is used that requires frequent adjustment of the throttle valve opening degree $\theta$ in order to achieve the torque according to the demand made by a driver.

Figure 15:
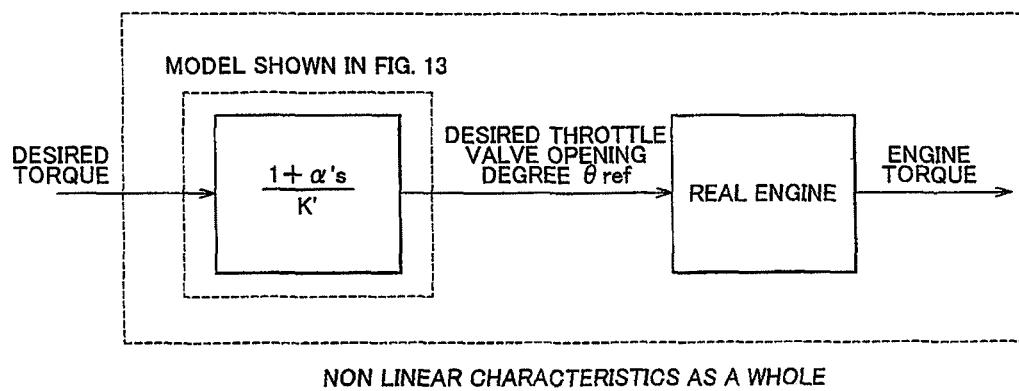
FIG. 15 is a diagram showing a torque control scheme according to the second embodiment.

In addition, with the above-described method shown in FIG. 13, it is possible to obtain a torque controller with noise-resistant characteristics (state-dependent model) while maintaining good response of torque by taking into consideration the dynamics of the intake system that varies according to the operational conditions of the internal combustion engine 10. FIG. 15 is a diagram showing a torque control scheme according to the second embodiment. Because the state-dependent model of this embodiment has the above-described characteristics, it is possible to eliminate the nonlinearity in the internal combustion engine system including the present model as shown in FIG. 15. In addition, this makes it possible to achieve the following excellent advantageous effects.

Figure 16:
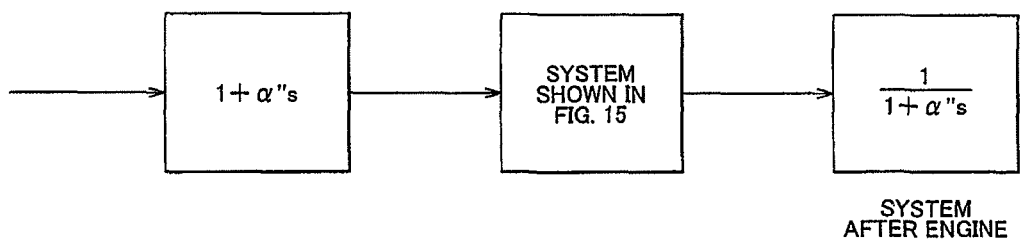
FIG. 16 is a diagram showing a vehicle control system in which a system having a first order lag element on the downstream side of an internal combustion engine system shown in FIG. 15.

FIG. 16 is a diagram showing a vehicle control system in which a system having a first order lag element on the downstream side of the internal combustion engine system shown in FIG. 15. With regard to the vehicle on which the internal combustion engine 10 is mounted, a conceivable system that has such a first order lag element ($1/(1+\alpha''s)$) is a system for controlling the speed of wheels, for example.

According to the state-dependent model of the second embodiment, the entire internal combustion engine system comes to have a linearity as described above. Thus, as shown in FIG. 16, it is possible to favorably compensate the response of the downstream-side system of the internal combustion engine system by providing a linear compensator in the upstream side of the internal combustion engine system. In addition, as described above, the system according to the second embodiment is resistant to noise (does not amplify noise), so that it is possible to use a compensator having the first order lead element as shown in FIG. 16 as the linear compensator provided in the upstream side of the internal combustion engine system. Thus, it is possible to further improve the response of the entire vehicle control system.

In the above-described first and second embodiments, the engine parameters, such as the engine speed ne, the valve timing vvt, and the ignition timing SA may be regarded as the "predetermined parameters" of the invention. The engine speed ne may be regarded as the "parameter that belongs to the first parameter group" of the invention. The above-described desired in-cylinder air amount value $kl_{cref}$ of the first embodiment and the above-described desired torque value $trq_{ref}$ of the second embodiment may be regarded as the "parameters that belong to the second parameter group" of the invention.

Next, a third embodiment of the invention will be described with reference to FIGS. 17A, 17B, 22A and 22B. A problem that arises when two desired torque values $Ti_f$ and $Ti_s$ that require different responses exist together. Torque control of the internal combustion engine 10 involves two desired torque values $Ti_f$ and $Ti_s$ that require different responses as described below. Control of behavior of a vehicle, such as speed change control of a transmission, for example, requires a response faster than the response required when a driver makes a demand for torque. The desired torque value in the former case is herein referred to as "the first desired torque value $Ti_f$." On the other hand, the desired torque value in the latter case where a driver makes a demand for torque is referred to as "the second desired torque value $Ti_s$." When, despite the fact that two desired torque values $Ti_f$ and $Ti_s$ exist, the above-described torque controller of the second embodiment is used without giving any consideration to this fact, improvement of the response is made equally for both desired torque values $Ti_f$ and $Ti_s$, and it is therefore impossible to achieve the response such that both of the two desired torque values $Ti_f$ and $Ti_s$ are sufficiently achieved. The response required in the case of the first desired torque value $Ti_f$ is referred to as "the fast response," and the response required in the case of the second desired torque value $Ti_s$ is referred to as "the slow response."

Figure 17A:
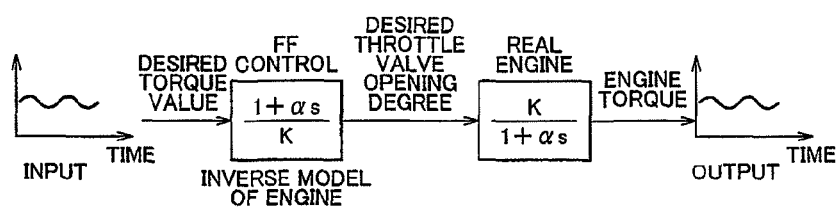
FIGS. 17A and 17B are diagrams showing a torque controller suitable for a first desired torque value $Ti_f$ that requires fast response, and a torque controller suitable for a second desired torque value $Ti_s$ that requires slow response.
Figure 17B:
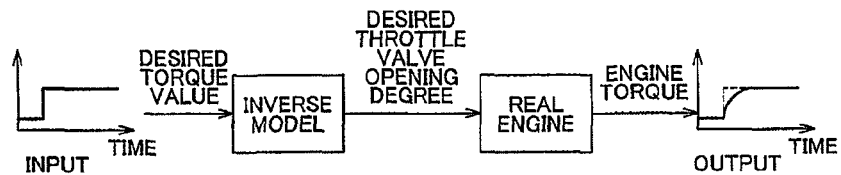

FIGS. 17A and 17B are diagrams showing a torque controller suitable for the first desired torque value $Ti_f$ that requires the fast response, and a torque controller suitable for the second desired torque value $Ti_s$ that requires the slow response. More specifically, the torque controller shown in FIG. 17A is a controller using the state-dependent model described in relation to the second embodiment shown in FIG. 13. According to such a torque controller, it becomes possible to output torque according to the input given when the torque of the internal combustion engine 10 is controlled, and it therefore becomes possible to favorably improve the response. The torque controller shown in FIG. 17A is a torque controller suitable for the first desired torque value $Ti_f$ that requires the fast response.

On the other hand, the torque controller shown in FIG. 17B is a controller that is generally used in an internal combustion engine. With such a torque controller, it is possible to output torque while leaving the delay in the response of the internal combustion engine 10 to the given input when the torque of the internal combustion engine 10 is controlled. Thus, it is possible to obtain a favorable torque response when a too fast response should be avoided in view of ensuring ride comfort, for example. The torque controller shown in FIG. 17B is a torque controller suitable for the second desired torque value $Ti_s$ that requires the slow response.

When both of two torque controllers as described above are provided, it is possible to deal with the case where the fast response only is required, with the use of the torque controller shown in FIG. 17A, and it is possible to deal with the case where the slow response only is required, with the use of the torque controller shown in FIG. 17B.

However, depending on the situation, the case where both of the fast and slow responses are simultaneously required can occur (that is, the case where the first desired torque value $Ti_f$ and the second desired torque value $Ti_s$ exist together can occur). When both the first and second desired torque values $Ti_f$ and $Ti_s$ exist together, if a method is used in which the desired throttle valve opening degree $\theta_{ref}$ is independently calculated for each of the desired torque values $Ti_f$ and $Ti_s$ and the calculation results are then summed, it is difficult to obtain a torque that correctly reflects the two desired torque values $Ti_f$ and $Ti_s$ because the variable K varies depending on the desired torque values $Ti_f$ and $Ti_s$.

Figure 18:
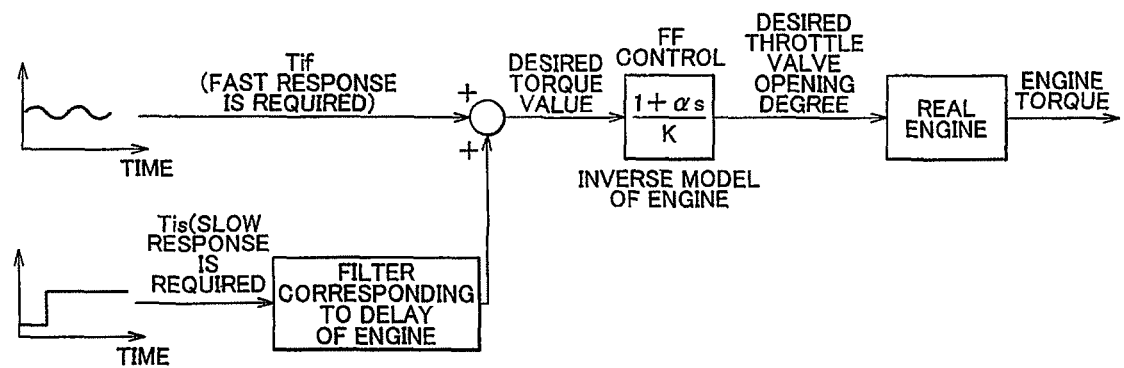
FIG. 18 is a diagram for describing a method that may be adopted to avoid a problem described in the description of a third embodiment for the purpose of comparison with a method of the third embodiment shown in FIG. 20.

FIG. 18 is a diagram for describing a method that can be used to avoid the above-described problem and that is described for the purpose of comparison with the method according to the third embodiment shown in FIG. 20 described later. In the configuration described with reference to FIG. 18 for the purpose of comparison, a filter is provided that gives a delay corresponding to the delay in the response of the internal combustion engine 10, in response to the input of the second desired torque value $Ti_s$ that requires the slow response. In this method, when two desired torque values $Ti_f$ and $Ti_s$ exist together, the final desired torque value $trq_{ref}$ to be inputted into the feed-forward (FF) controller (inverse model) is calculated by summing the first desired torque value $Ti_f$ and the second desired torque value $Ti_s$ that has been passed through the filter. With the use of such a method, even when two desired torque values $Ti_f$ and $Ti_s$ exist together, it is possible to deal with the two desired torque value $Ti_f$ and $Ti_s$ using a single torque controller. However, when such a method is used, the process to pass the second desired torque value $Ti_s$ through the filter as described above is necessary, and there is a problem that the calculation becomes time consuming.

Figure 19:
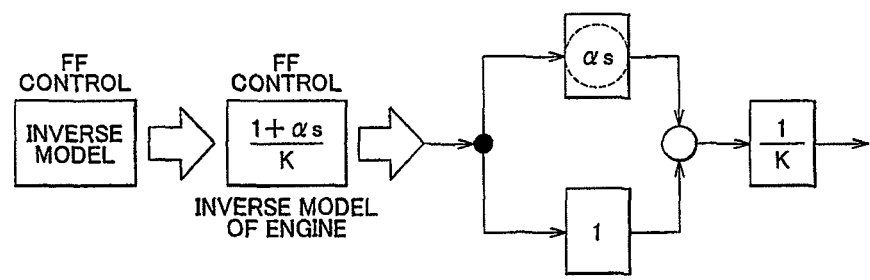
FIG. 19 is a diagram for describing advantages achieved when a torque controller described in the description of the second embodiment is used.

FIG. 19 is a diagram for describing advantages achieved when the torque controller of the second embodiment of the invention described above is used. When the above-described torque controller of the second embodiment is used, it is possible to express the FF controller in the form of the transfer function $((1+\alpha s)/K)$ using the state-dependent coefficient $\alpha$. Because the FF controller is expressed by the transfer function $((1+\alpha s)/K)$, it becomes possible to input the desired torque value into the FF controller through separate channels, in one of which the differential operator term $\alpha s$ is applied to the input, in the other of which the differential operator term $\alpha s$ is not applied to the input. In this embodiment, this advantage is utilized, and only the first desired torque value $Ti_f$, which requires the fast response, is passed through the channel in which the differential operator term as is applied to the input as described below with reference to FIG. 20. In other words, of the first and second desired torque values $Ti_f$ and $Ti_s$, only the first desired torque value $Ti_f$ is the subject of differentiation.

Figure 20:
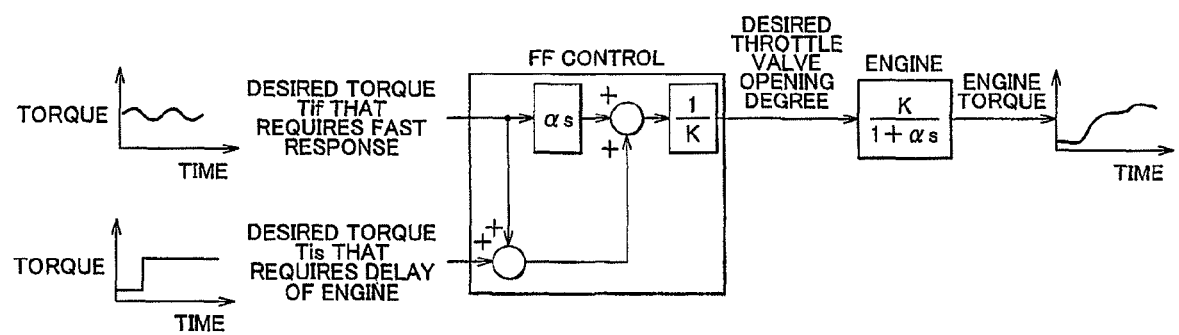
FIG. 20 is a diagram for describing a torque controller according to the third embodiment.

FIG. 20 is a diagram for describing a torque controller according to a third embodiment of the invention. More specifically, as shown in FIG. 20, in this embodiment, only the first desired torque value $Ti_f$, which requires the fast response, is passed through the channel in which the differential operator term $\alpha s$ is applied to the input, and the sum of the first desired torque value $Ti_f$ that is not passed through the channel in which the differential operator term $\alpha s$ is applied to the input and the second desired torque value $Ti_s$ is added to the differentiated first desired torque value $Ti_f$ to obtain the final desired torque value $trq_{ref}$. Because the coefficient $\alpha$ is a function that depends on the desired torque values $Ti_f$ and $Ti_s$, and the engine speed ne, the coefficient α cannot be calculated until the desired torque values $Ti_f$ and $Ti_s$ are inputted. In this embodiment, in calculating the coefficient α, instead of using only the first desired torque value $Ti_f$ that is passed through the channel in which the differential operator term as is applied to the input, the sum of both the desired torque values $Ti_f$ and $Ti_s$ is used.

According to the torque controller shown in FIG. 20 described above, it is possible to express the FF controller in the form of the transfer function ((1+αs)+K), and therefore, even when the two desired torque values $Ti_f$ and $Ti_s$ that require different responses are simultaneously inputted, it is possible to include only the first desired torque value $Ti_f$, which requires the fast response, in the subjects of differentiation. Thus, a single torque controller that has a simple configuration can perform the same function as the torque controller shown in FIG. 17A for the demand that requires the fast response and at the same time can perform the same function as the torque controller shown in FIG. 17B for the demand that requires the slow response. Accordingly, it is possible deal with the case where two desired torque values $Ti_f$ and $Ti_s$ that require different responses are simultaneously inputted, while favorably reducing the calculation load of the ECU 50.

Figure 21A:
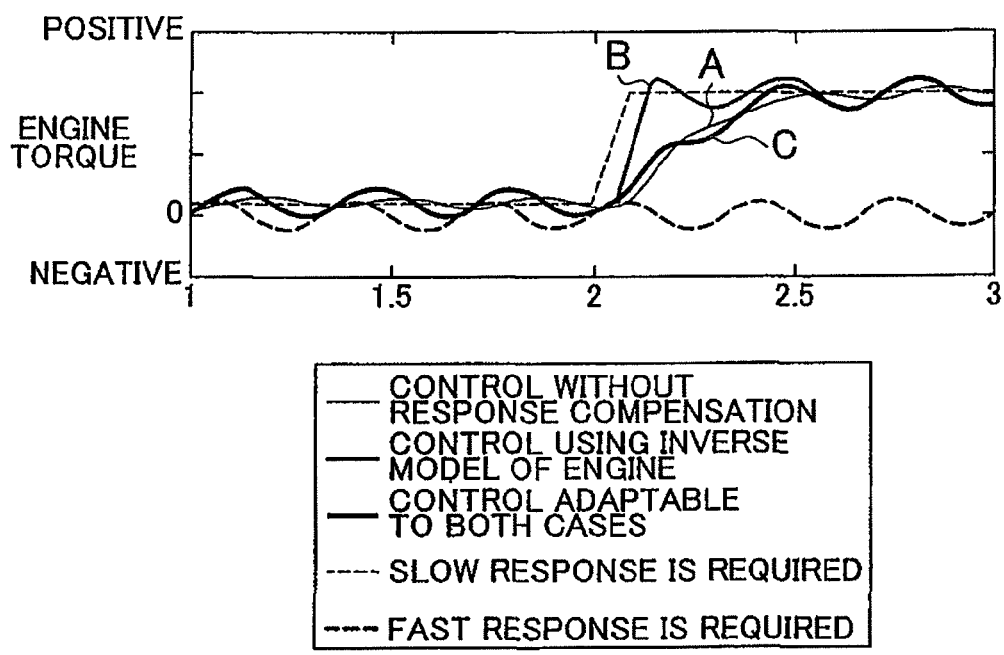
FIGS. 21A and 21B are time charts for describing advantageous effects achieved when the torque controller shown in FIG. 20 is actually used to control an internal combustion engine.
Figure 21B:
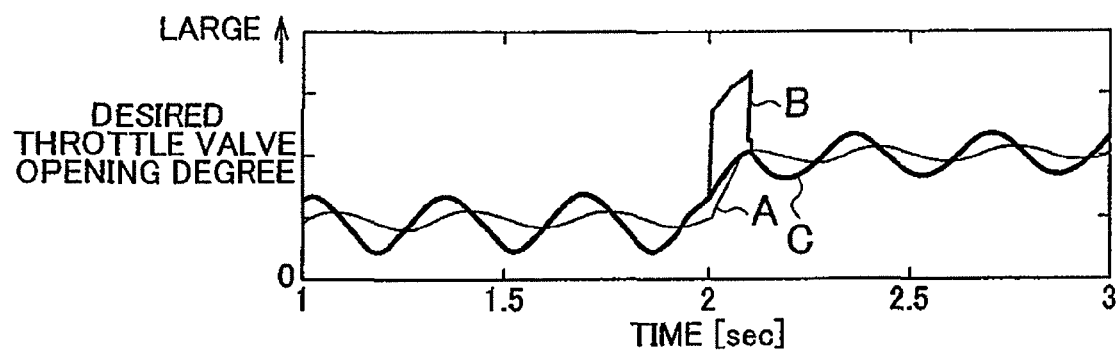

FIGS. 21A and 21B are time charts for describing advantageous effects achieved when the torque controller shown in FIG. 20 is actually used to control the internal combustion engine 10. It should be noted that the waveform indicated as "Control without Response Compensation (A)" in FIGS. 21A and 21B shows the control performed when the above-described torque controller shown in FIG. 17B is used. The waveform indicated as "Control using Inverse Model of Engine (B)" in FIGS. 21A and 21B shows the control performed when the above-described torque controller shown in FIG. 17A is used. The waveform indicated as "Control Adaptable to Both Cases (C)" in FIGS. 21A and 21B shows the control performed when the above-described torque controller shown in FIG. 20 is used.

It can be seen from FIGS. 21A and 21B that when the Control without Response Compensation (A) is used, although the system follows the demand that requires the slow response, the system cannot follow the demand that requires the fast response. It can also seen from the same figures that when the Control using Inverse Model of Engine (B) is used, the torque response is too quick because the system directly meets the demand that requires the fast response. However, it can be seen from the same figures that when the Control Adaptable to Both Cases (C) using the torque controller shown in FIG. 20 is used, both the demands that require the fast and slow response, respectively, are favorably met.

Figure 22A:
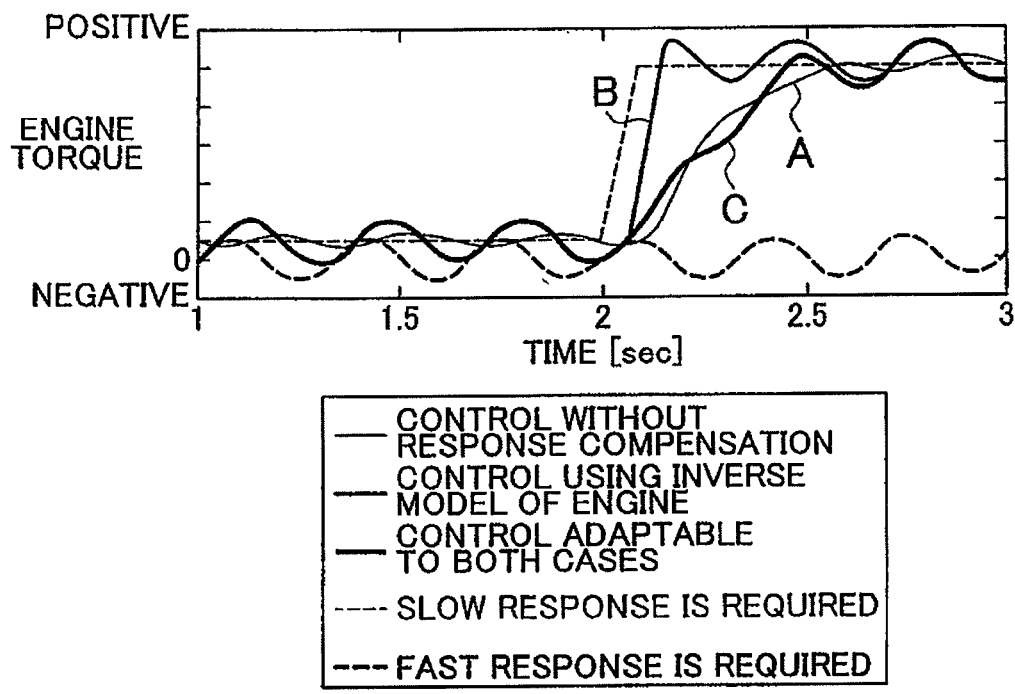
FIGS. 22A and 22B are time charts for describing advantageous effects achieved when the torque controller shown in FIG. 20 is actually used to control an internal combustion engine.
Figure 22B:
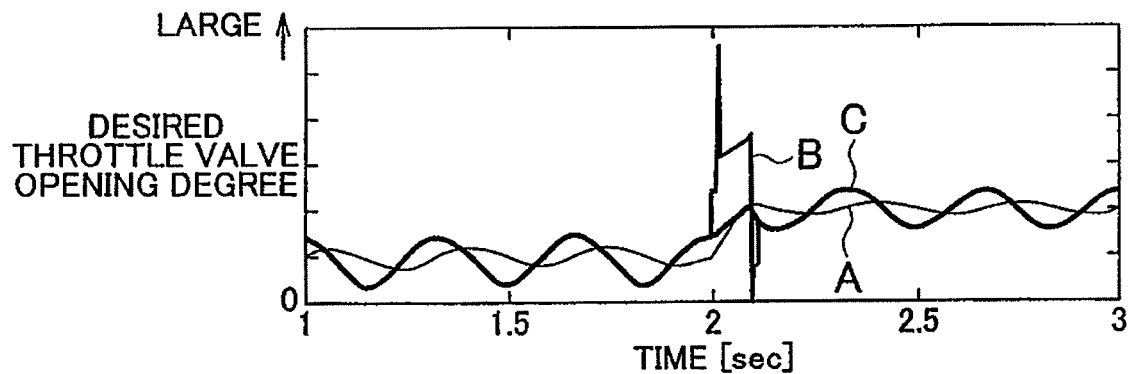

FIGS. 22A and 22B are time charts for describing advantageous effects achieved when the torque controller shown in FIG. 20 is actually used to control the internal combustion engine 10. The intake system models of the above-described first to third embodiments are expressed in the form of the first order lag element. However, the torque controller of this embodiment shown in FIG. 20 can be realized in the same way of thinking not only in the case of the first order lag system, but also in the case of another system, such as the second order lag system. FIGS. 22A and 22B are diagrams for describing advantageous effects achieved when the invention is applied to control of an internal combustion engine in which the intake system model is expressed in the form of the second order lag.

It can be seen from FIGS. 22A and 22B that even when the intake system model is expressed in the form of the second order lag, both the demands that require the fast and slow response, respectively, are favorably met by using the torque controller of this embodiment shown in FIG. 20.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle control apparatus for calculating a desired value of a controlled variable of an actuator installed in a vehicle, using a model expression including derivative portions in each of which one of predetermined parameters that are inputted is differentiated with respect to time, the apparatus being characterized in that
the predetermined parameters are divided into a first parameter group, to which part of the predetermined parameters belong that oscillate at a frequency higher than a first frequency, and a second parameter group, to which remaining part of the predetermined parameters belong that oscillate at a frequency lower than a second frequency that is lower than the first frequency; and
only the remaining part of the predetermined parameters that belong to the second parameter group are included in subjects of differentiation in the model expression, wherein in the model expression, a desired throttle opening degree is calculated by using a transfer function of a feed forward control.

2. The vehicle control apparatus according to claim 1, wherein, in the model expression, derivatives of the predetermined parameter of the first parameter group are approximated to zero.

3. The vehicle control apparatus according to claim 1, wherein,
in the model expression, every derivative portion, in which one of the part of the predetermined parameters that belong to the first parameter group is differentiated with respect to time, is transformed into a product of a first derivative portion, in which the one of the part of the predetermined parameters that belong to the first parameter group is differentiated with respect to one of the remaining part of the predetermined parameters that belong to the second parameter group, and a second derivative portion, in which the one of the remaining part of the predetermined parameters that belong to the second parameter group is differentiated with respect to time, wherein the parameters that belong to the first parameter group are excluded from the subjects of differentiation.

4. The vehicle control apparatus according to claim 1, wherein
one of the predetermined parameters that belongs to the first parameter group is engine speed.

5. A vehicle control apparatus that uses a model expression, of which inputs include predetermined parameters and a desired controlled object value of a controlled object in a vehicle, to calculate a desired value of a controlled variable of an actuator installed in a vehicle that is required to control the controlled object to the desired controlled object value, the apparatus being characterized in that
in the model expression, the desired controlled object value is included in subjects of differentiation, and, of the predetermined parameters, every parameter that oscillates at a frequency higher than a predetermined frequency is excluded from the subjects of differentiation, wherein in the model expression, a desired throttle opening degree is calculated by using a transfer function of a feed forward control.

6. The vehicle control apparatus according to claim 5, wherein,
in the model expression, every derivative portion, in which one of the predetermined parameters that oscillates at a frequency higher than the predetermined frequency is differentiated with respect to time, is approximated to zero.

7. The vehicle control apparatus according to claim 5, wherein
the model expression is obtained as an inverse function of an expression with which the desired controlled object value is calculated by inputting the desired controlled variable value of the actuator installed in the vehicle into a first order lag element with a time constant containing at least part of the predetermined parameters.

8. The vehicle control apparatus according to claim 7, wherein,
in the model expression, what is multiplied by the time constant and is therefore included in the subjects of differentiation is limited to the desired controlled object value.

9. The vehicle control apparatus according to claim 5, wherein
the desired controlled object value is a desired torque value or a desired in-cylinder air amount value of an internal combustion engine.

10. The vehicle control apparatus according to claim 9, wherein
the desired controlled object value contains a first desired torque value, which requires, of the actuator, a response within a first response time, and a second desired torque value, which requires, of the actuator, a response within a second response time longer than the first response time, and
the vehicle control apparatus generates a final desired controlled object value by differentiating only the first desired torque value of the desired controlled object value and then summing a thus obtained derivative of the first desired torque value and the second desired torque value.

11. The vehicle control apparatus according to claim 5, wherein
one of the predetermined parameters that oscillates at a frequency higher than the predetermined frequency is engine speed.

12. The vehicle control apparatus according to claim 1, wherein
the actuator installed in the vehicle is a throttle valve that is disposed in an intake passage of an internal combustion engine and driven by a motor.

13. The vehicle control apparatus according to claim 1, wherein the transfer function of the model expression is $(1+\alpha s)/K$.

14. A method of controlling a desired value of a controlled variable of an actuator installed in a vehicle, comprising:
receiving predetermined parameters;
dividing the predetermined parameters into a first parameter group, to which the parameters belong that oscillate at a frequency higher than a first frequency, and a second parameter group, to which the parameters belong that oscillate at a frequency lower than a second frequency that is lower than the first frequency; and
differentiating the parameters that belong to the second parameter group with respect to time, wherein in a model expression, a desired throttle opening degree is calculated by using a transfer function of a feed forward control.

15. A method of controlling a desired value of a controlled variable of an actuator installed in a vehicle, comprising:
receiving predetermined parameters and a desired controlled object value of a controlled object in a vehicle;
including the desired controlled object value in subjects of differentiation; and
excluding, of the predetermined parameters, every parameter that oscillates at a frequency higher than a predetermined frequency from the subjects of differentiation, wherein in a model expression, a desired throttle opening degree is calculated by using a transfer function of a feed forward control.

16. The method according to claim 14, wherein the transfer function of the model expression is $(1+\alpha s)/K$.

17. The vehicle control apparatus according to claim 5, wherein
the actuator installed in the vehicle is a throttle valve that is disposed in an intake passage of an internal combustion engine and driven by a motor.

18. The vehicle control apparatus according to claim 5, wherein the transfer function of the model expression is $(1+\alpha s)/K$.

19. The method according to claim 14, wherein the transfer function of the model expression is $(1+\alpha s)/K$.

* * * * *